United States Patent
Sion et al.

(10) Patent No.: US 11,003,787 B2
(45) Date of Patent: May 11, 2021

(54) SECURE DATA MANAGEMENT SYSTEM AND METHOD

(71) Applicant: PRIVATE MACHINES INC., Brooklyn, NY (US)

(72) Inventors: Radu Sion, Brooklyn, NY (US); Sumeet Vijay Bajaj, New York, NY (US); Jan Wojciech Kasiak, Seaford, NY (US)

(73) Assignee: Private Machines Inc., Brooklyn, NY (US)

( * ) Notice: Subject to any disclaimer, the term of this patent is extended or adjusted under 35 U.S.C. 154(b) by 582 days.

(21) Appl. No.: 15/742,498

(22) PCT Filed: May 7, 2016

(86) PCT No.: PCT/US2016/031393
§ 371 (c)(1),
(2) Date: Jan. 5, 2018

(87) PCT Pub. No.: WO2017/023388
PCT Pub. Date: Feb. 9, 2017

(65) Prior Publication Data
US 2019/0087600 A1 Mar. 21, 2019

Related U.S. Application Data

(60) Provisional application No. 62/189,650, filed on Jul. 7, 2015.

(51) Int. Cl.
*G06F 21/62* (2013.01)
*H04L 9/08* (2006.01)
(Continued)

(52) U.S. Cl.
CPC .......... *G06F 21/6227* (2013.01); *G06F 16/13* (2019.01); *G06F 16/178* (2019.01);
(Continued)

(58) Field of Classification Search
CPC .... G06F 21/6227; G06F 16/21; G06F 16/903; G06F 16/2246; H04L 63/10; H04L 67/1097
See application file for complete search history.

(56) References Cited

U.S. PATENT DOCUMENTS

| | | |
|---|---|---|
| 7,647,329 B1 | 1/2010 | Fischman et al. |
| 2004/0243799 A1 | 12/2004 | Hacigumus et al. |

(Continued)

OTHER PUBLICATIONS

Hore et al., A Privacy-Preserving Index for Range Queries, Proceedings of the Thirtieth international conference on Very large data bases, vol. 30, VLDB Endowment, 2004.

(Continued)

*Primary Examiner* — Irete F Ehichioya
*Assistant Examiner* — Huen Wong
(74) *Attorney, Agent, or Firm* — The Law Office of Daniel T. Weglarz, P.C.

(57) ABSTRACT

A secure data management system and method which separates query processing operations from transaction management and data storage operations to provides secure outsourced data management assurances while remaining practically viable for commercial deployment. The secure data management system and method includes a untrusted database module which performs transaction management and data storage operations on encrypted data from at least one network accessible computer and a trusted database module which processes user generated queries and commands on a secure client device by selectively accessing, decrypting and re-encrypting the encrypted data on the at least one network accessible computer. In this regard, total privacy can be maintained while still outsourcing transaction management and data storage operations to untrusted third parties because all sensitive operations are performed in a (Continued)

Sample CipherQuery DBMS Design secure environment and the transaction management and data storage operations can only access encrypted data.

24 Claims, 9 Drawing Sheets

(51) Int. Cl.

| | | |
|---|---|---|
| *H04L 29/06* | (2006.01) | |
| *G06F 16/21* | (2019.01) | |
| *G06F 16/22* | (2019.01) | |
| *G06F 16/903* | (2019.01) | |
| *G06F 16/178* | (2019.01) | |
| *G06F 16/13* | (2019.01) | |
| *H04L 29/08* | (2006.01) | |

(52) U.S. Cl.
CPC .......... *G06F 16/21* (2019.01); *G06F 16/2246* (2019.01); *G06F 16/2272* (2019.01); *G06F 16/903* (2019.01); *G06F 21/62* (2013.01); *G06F 21/6218* (2013.01); *H04L 9/0861* (2013.01); *H04L 9/0891* (2013.01); *H04L 63/0428* (2013.01); *H04L 63/10* (2013.01); *H04L 67/1097* (2013.01)

(56) References Cited

U.S. PATENT DOCUMENTS

| | | | | |
|---|---|---|---|---|
| 2005/0262182 | A1* | 11/2005 | Thole | G06F 9/466 709/200 |
| 2006/0036574 | A1* | 2/2006 | Schweigkoffer | G06F 16/2329 |
| 2010/0185847 | A1* | 7/2010 | Shasha | G06F 21/54 713/150 |
| 2013/0212165 | A1* | 8/2013 | Vermeulen | H04L 67/42 709/203 |
| 2015/0039887 | A1 | 2/2015 | Kahol et al. | |

OTHER PUBLICATIONS

Elovici et al., A Structure Preserving Database Encryption Scheme, Secure Data Management. Lecture Notes in Computer Science, vol. 3178, Springer, 2004.
Bajaj et al., TrustedDB: A Trusted Hardware based Database with Privacy and Data Confidentiality, IEEE Transactions on Knowledge and Data Engineering, vol. 26, issue 3, IEEE, 2014.
Bajaj et al., Ficklebase: Looking into the Future to Erase the Past, Proceedings of the 29th International Conference on Data Engineering (ICDE), IEEE, 2013.
Sion et al., Fast Oblivious Storage. Transactions on Information and System Security, vol. 15, No. 4, Article 39, ACM, 2013.
Sion, Secure Data Outsourcing, VLDB, 2007.
Hacigümüş et al., Executing SQL over Encrypted Data in the Database-Service-Provider Model. Proceedings of the 2002 ACM SIGMOD International Conference on Management of Data, ACM, 2002.
Erez et al., Designing Secure Indexes for Encrypted Databases, Data and Applications Security XIX. DBSec 2005. Lecture Notes in Computer Science, vol. 3654. Springer, 2005.
Santana De Oliveira et al., Privacy-Preserving Techniques and System for Streaming Databases, Proceedings of the 4th IEEE International Conference on Information Privacy, Security, Risk and Trust, PASSAT 2012, IEEE, 2012.
Bajaj et al., TrustedDB: A Trusted Hardware based Outsourced Database Engine. Proceedings of the 37th International Conference on Very Large Data Bases, VLDB Endowment, 2011.
Salperwyck et al., GhostDB: Hiding Data from Prying Eyes, Proceedings of the 33rd International Conference on Very Large Data Bases, ACM, 2007.
Bajaj et al., CorrectDB: SQL Engine with Practical Query Authentication, Proceedings of the VLDB Endowment, vol. 6, Issue 7, pp. 529-540, VLDB Endowment, 2013.
Kuzu et al., Efficient Privacy-Aware Search over Encrypted Databases, Proceedings of the 4th ACM conference on Data and application security and privacy, pp. 249-256, ACM, 2014.
Baumann et al., Shielding Applications from an Untrusted Cloud with Haven, Proceedings of the 11th USENIX Symposium on Operating Systems Design and Implementation, pp. 267-283, UNSENIX, 2014.
Hacigümüş et al., Search on encrypted data, Secure Data Management in Decentralized Systems, pp. 383-425, Springer, Boston, MA, 2007.
Hacigümüş et al., Efficient Execution of Aggregation Queries over Encrypted Relational Databases, Database Systems for Advanced Applications, DASFAA 2004, Lecture Notes in Computer Science, vol. 2973, Springer, 2004.
Khanh, Oblivious Search and Updates for Outsourced Tree-Structured Data on Untrusted Servers, International Journal of Computer Science & Applications, vol. 2, No. 2, pp. 67-84, Technomathematics Research Foundation, 2005.
Grofig et al., Privacy by Encrypted Databases, Privacy Technologies and Policy. APF 2014, Lecture Notes in Computer Science, vol. 8450, Springer, 2014.
Kerschbaum et al., Optimal Re-Encryption Strategy for Joins in Encrypted Databases, Data and Applications Security and Privacy XXVII, DBSec 2013, Lecture Notes in Computer Science, vol. 7964. Springer, 2013.
Mehak et al., Security Aspects of Database as a Service (DBaaS) in Cloud Computing, Cloud Computing: Challenges, Limitations and R&D Solutions, pp. 297-324, Springer International Publishing, 2014.
Sion et al., The Blind Stone Tablet: Outsourcing Durability to Untrusted Parties, NDSS, 2009.
S. Zittrower et al., "Encrypted Phrase Searching in the Cloud," 2012 IEEE Global Communications Conference (GLOBECOM), Dec. 2012, pp. 764-770, IEEE, Anaheim, CA, USA.

* cited by examiner

| CustomerID | Name  | LastName | Address          | Balance |
|------------|-------|----------|------------------|---------|
| 0001       | John  | Smith    | 1 Main Street    | 80.00   |
| 0002       | Mary  | Johnson  | 57 Prospect Drive| 111.73  |
| 0003       | Kathy | Smolka   | 15 Elm Drive     | 237.00  |
| 0017       | Dan   | Priebus  | 18 Oak Street    | 99.12   |

Relational Model

| Activity Code | Activity Name |
|---|---|
| 23 | Patching |
| 24 | Overlay |
| 25 | Crack Sealing |

Key = 24

| Activity Code | Date | Route No. |
|---|---|---|
| 24 | 01/12/01 | I-95 |
| 24 | 02/08/01 | I-66 |

| Date | Activity Code | Route No. |
|---|---|---|
| 01/12/01 | 24 | I-95 |
| 01/15/01 | 23 | I-495 |
| 02/08/01 | 24 | I-66 |

FIG 9

SECURE DATA MANAGEMENT SYSTEM AND METHOD

CROSS REFERENCE TO RELATED APPLICATIONS

This application claims the benefit of and incorporates by reference U.S. provisional patent application Ser. No. 62/189,650 filed in the United States on Jul. 7, 2015.

STATEMENT REGARDING FEDERALLY-SPONSORED RESEARCH OR DEVELOPMENT

This invention was made with government support under award number IIP-1329509 awarded by the National Science Foundation. The government has certain rights in the invention.

BACKGROUND OF THE INVENTION

Field of the Invention

The present invention generally relates to database management and, more particularly, to a data management system which provides secure outsourced data management assurances which still guaranteeing that database transactions are processed reliably.

Description of the Existing Art

Generally, a database is simply an organized collection of data. In typical database implementations, the data may be organized to model aspects of reality in a way that supports processes requiring information. For example, data may be organized to model the availability of rooms in hotels in a way that supports finding a hotel with vacancies. As such, the structured mechanisms available for managing data often define the utility of a given database.

Database management systems (DBMS) are computer software applications that interact with the user, other applications, and a database itself to capture and analyze data. A general-purpose DBMS is designed to allow the definition, creation, querying, update, and administration of databases. Well-known DBMSs include MySQL, PostgreSQL, Microsoft SQL Server, Oracle, Sybase and IBM DB2. A database is not generally portable across different DBMSs, but different DBMS can interoperate by using standards such as SQL and ODBC or JDBC to allow a single application to work with more than one DBMS. Database management systems are often classified according to the database model that they support; the most popular database systems since the 1980s have all supported the relational model as represented by the SQL language. Because of the close relationship between them, the term "database" is often used casually to refer to both a database and the DBMS used to manipulate it.

Existing DBMSs provide various functions that allow management of a database and its data which can be classified into four main functional groups:

a. Data definition. Creation, modification and removal of definitions that define the organization of the data.
b. Update. Insertion, modification, and deletion of the actual data.
c. Retrieval. Providing information in a form directly usable or for further processing by other applications. The retrieved data may be made available in a form basically the same as it is stored in the database or in a new form obtained by altering or combining existing data from the database.
d. Administration. Registering and monitoring users, enforcing data security, monitoring performance, maintaining data integrity, dealing with concurrency, and recovering information that has been corrupted by some event such as an unexpected system failure.

Further, a DBMS may involve multiple servers or comprise a collection of DBMSes working together. In the remainder of this disclosure we will use DBMS to denote one or more DBMSes working together to offer a DBMS service.

Many DBMSes store data in files. Each file is divided up into a set of pages. A storage engine component (S) reads and writes data in page units to and from a storage device or system. A query engine component (QP) processes the pages to execute client queries. A transaction manager component (TM) provides key transactional requirements such as Atomicity (A), Consistency (C), Isolation (I), and Durability (D).

The implementation of a DBMS usually involves a number of additional components which we briefly describe in the following.

Storage (S)

A DBMS usually needs to store its data during various stages of processing it as well as at rest. A number of options exist for storage, including in-memory and on-disk.

In-memory databases (IMDBs, also main memory database system or MMDB or memory resident database) primarily rely on main computer memory for computer data storage. They are contrasted with "traditional" DBMS that employ disk storage mechanisms. IMDBs are faster than disk-based databases since the internal optimization algorithms are simpler and execute fewer CPU instructions. Accessing data in memory eliminates disk-specific seek times when querying the data, which provides faster and more predictable performance than disk. IMDBs suffer from the drawback of being limited by the size of the available memory; disk capacity used by traditional DBMS is usually significantly cheaper and more plentiful.

Most traditional DBMSes are using disk-based storage which stores data on a local or network-accessible hard disk or array of hard disks. For such databases, tables and indexes may be stored on disk in one of a number of forms, including ordered/unordered flat files, ISAM (Indexed Sequential Access Method), heap files, hash buckets, or B+ trees. Each form has its own particular advantages and disadvantages. The most commonly used forms are B+ trees and ISAM.

Query Processing (QP)

DBMSes allow clients to access the database by submitting queries that the DBMS will process and return the result of to the clients. Queries are formulated in a "query language" which also corresponds to a "database model" which defines how the database structures itself and its data.

Databases and DBMSs can be categorized according to the database model(s) that they support (such as relational or XML), the type(s) of computer they run on (from a server cluster to a mobile phone), the query language(s) used to access the database (such as SQL or XQuery), and their internal engineering, which affects performance, scalability, resilience, and security.

Database Models. A large number of database models exist. Examples include: the Hierarchical database model, the Network model, the Relational model, the Entity-relationship model, the Enhanced entity-relationship model, the Object model, the Document model, the Entity-attribute-value model, the Star schema and so on.

By far, the most popular example of a database model is the relational model, which uses a table-based format. In the following we will discuss mainly the relational model and associated DBMSes, but would like to stress that the mechanisms described here may be applied to any database model.

Relational Model. The relational model for database management is a database model based on "first-order predicate logic", first formulated and proposed in 1969 by Edgar F. Codd. In the relational model of a database, all data is represented in terms of tuples (in most existing implementations tuples are also known as "rows"), grouped into relations (in most existing implementations relations are also known as "tables"). A database organized in terms of the relational model is a relational database FIG. 7 summarizes the main elements of the relational model.

FIG. 8 illustrates a relation with customer information data.

The purpose of the relational model is to provide a declarative method for specifying data and queries: users directly state what information the database contains and what information they want from it, and let the database management system software take care of describing data structures for storing the data and retrieval procedures for answering queries.

Structured Query Language (SQL). The most common query language used with the relational model is the Structured Query Language (SQL). Most relational databases use the SQL data definition and query language; these systems implement what can be regarded as an engineering approximation to the relational model. A table in an SQL database schema corresponds to a predicate variable; the contents of a table to a relation; key constraints, other constraints, and SQL queries correspond to predicates. SQL databases, however, deviate from the relational model in many details, which will not be discussed here.

A data definition language or data description language (DDL) is a language for defining data structures, especially database schemas. SQL uses a collection of imperative verbs whose effect is to modify the schema of the database by adding, changing, or deleting definitions of tables or other objects. These statements can be freely mixed with other SQL statements, so the DDL is not truly a separate language.

Most relational DBMSs logically organize data into databases, schemas, relations, and tuples. Each database is a set of schemas. A schema is a set of relations. Each relation is a set of tuples. Physically, each relation consists of one or more files. A file is further divided into pages. Clients are aware of data organization into databases, schemas, relations, and tuples. Clients are unaware of files and pages. Clients use SQL to create, modify and access tuple data. SQL queries are categorized into DDL and DML. DDL queries typically operate at the database, schema, and relation level. For example, "create database," "drop relation," and so forth. DML queries, such as "select" and "update" queries, operate at the tuple level. DDL queries thus relate to data organization and DML queries to data access and modification. For each relation visible to clients, auxiliary relations are created and maintained by a DBMS. Auxiliary relations' data is organized similar to client-visible relations. Auxiliary relations include indexes (Btree, hash, etc), free-space maps, visibility maps, TOAST tables, etc.

The following is a simple example of a SQL query containing a DDL statement, that instructs the DBMS to define and create the above "customers" relation:

```
CREATE TABLE customers(
    CustomerID  INT  PRIMARY KEY  NOT NULL,
    Name      TEXT   NOT NULL,
    LastName  TEXT   NOT NULL,
    Address   CHAR(50),
    Balance   REAL
);
```

The following is a simple example of a SQL query that retrieves and displays the first name of all customers from the above customer table with a balance greater than 100.00:

SELECT Name FROM customers WHERE customers.balance >100;

In the relational model, related records are linked together with a "key" (e.g., the "CustomerID" column in the above customers relation). FIG. 9 illustrates a sample relational database with three relations linked through the "activity code" key.

Indexing. To quickly access items, databases keep key data "indexed." A database index is a data structure that improves the speed of data retrieval operations on a database table at the cost of additional writes and storage space to maintain the index data structure. Indexes are used to quickly locate data without having to search every row in a database table every time a database table is accessed. Indexes can be created using one or more columns of a database table, providing the basis for both rapid random lookups and efficient access of ordered records.

B-trees are a "tree" data structure that keep data sorted and allow searches, sequential access, insertions, and deletions in logarithmic time. The B-tree is a generalization of a binary search tree in that a node can have more than two children. It is commonly used in databases and file-systems.

Indices can be implemented using a variety of other data structures. Other popular indices include balanced trees, B+ trees and hashes.

Deployment Model. A typical DBMS deployment involves a number of entities, often including a "data owner," a "database administrator" (which may be the same as the data owner), one or more "clients" which are authorized to query the database, and a database "server." The database server may in fact comprise multiple computers or an entire server farm. "Server" is used herein to denote any of these setups. The data owner, aided by the administrator, may initialize the database server, set up the database relational schema, and upload an initial data set into the database. The administrator may then set up database credentials for a number of authorized clients. Authorized clients may connect to the database server over a network connection and submit queries to the database. The database server executes the queries and returns the results to the clients. In a typical setup, the data owner, database administrator and clients are part of the same organization and of a common implicit trust realm.

Transaction Management (TM)

Concurrency. If someone is reading from a database at the same time as someone else is writing to it, it is possible that the reader will see a half-written or inconsistent piece of data. There are several ways of solving this problem, known as concurrency control methods. The simplest way is to make all readers wait until the writer is done, which is known as a lock.

Data Lock. A lock ("read lock," "write lock," "range lock," and so forth) is used when multiple parties (software processes, users etc.) need to access a database concurrently. Locks prevents data from being corrupted or invalidated when these multiple parties try to read while others write to the database. Any single party can only modify those database records (items in the database) for which it has "acquired" a lock that gives them exclusive access to the record until the lock is released. Locking not-only provides exclusivity to writes but also prevents (or controls) reading of unfinished modifications ("uncommitted" data). A "read lock" can be used to prevent other users from reading a record which is being updated, so that others will not act upon soon-to-be-outdated information.

Transactions. Databases allow clients to execute queries against their dataset. To ensure that queries submitted simultaneously by different clients do not interfere in unwanted ways (e.g., by modifying the same data unpredictably etc), the notion of "transaction" has been introduced. Multiple queries submitted by a client may be organized into a "transaction."

A transaction symbolizes a unit of work treated in a coherent and reliable way independent of other transactions. A transaction generally represents any change in database. Transactions in databases have two main purposes:
  a. To provide reliable units of work that allow correct recovery from failures and keep a database consistent even in cases of system failure, when execution stops (completely or partially) and many operations upon a database remain uncompleted, with unclear status.
  b. To provide isolation between programs accessing a database concurrently. If this isolation is not provided, the program's outcome are possibly erroneous.

ACID. A database transaction, by definition, must be atomic, consistent, isolated and durable. Database practitioners often refer to these properties of database transactions using the acronym ACID. Transactions provide an "all-or-nothing" proposition, stating that each work-unit performed in a database must either complete in its entirety or have no effect whatsoever. Further, the system must isolate each transaction from other transactions, results must conform to existing constraints in the database, and transactions that complete successfully must get written to durable storage.
  a. Atomicity. In an atomic transaction, a series of database operations either all occur, or nothing occurs. The series of operations cannot be divided apart and executed partially from each other, which makes the series of operations "indivisible," hence the name. A guarantee of atomicity prevents updates to the database occurring only partially, which can cause greater problems than rejecting the whole series outright. In other words, atomicity means indivisibility and irreducibility. As a consequence, the transaction cannot be observed to be in progress by another database client. At one moment in time, it has not yet happened, and at the next it has already occurred in whole (or nothing happened if the transaction was cancelled in progress).
  b. Consistency in database systems refers to the requirement that any given database transaction must only change affected data in allowed ways. Any data written to the database must be valid according to all defined rules, including constraints, cascades, triggers, and any combination thereof. This does not guarantee correctness of the transaction in all ways the application programmer might have wanted (that is the responsibility of application-level code) but merely that any programming errors cannot result in the violation of any defined rules.
  c. Isolation. In database systems, isolation determines how transaction integrity is visible to other users and systems. For example, when a user is creating a Purchase Order and has created the header, but not the PO lines, an isolation level determines whether the header is available for other systems/users, carrying out concurrent operations (such as a report on Purchase Orders), to see. A lower isolation level increases the ability of many users to access data at the same time, but increases the number of concurrency effects (such as dirty reads or lost updates) users might encounter. Conversely, a higher isolation level reduces the types of concurrency effects that users may encounter, but requires more system resources and increases the chances that one transaction will block another. Isolation is typically defined at database level as a property that defines how/when the changes made by one operation become visible to other. Isolation levels are discussed in detail below.
  d. Durability. In database systems, durability guarantees that transactions that have committed will survive permanently. For example, if a flight booking reports that a seat has successfully been booked, then the seat will remain booked even if the system crashes. Many DBMSs implement durability by writing transactions into a transaction log that can be reprocessed to recreate the system state right before any later failure. A transaction is deemed committed only after it is entered in the log. Durability can be achieved by flushing the transaction's log records to non-volatile storage before acknowledging commitment to the query client.

Before proceeding, we note that for various reasons, including efficiency, higher availability and software simplicity, certain database implementations may choose to not implement all ACID properties. For example, certain databases provide a weaker notion of "eventual consistency" which allows the database to return inconsistent results to different clients during certain period of times to increase "availability"—as long as "eventually" the database starts to return consistent responses to future clients. In the following, we will focus on the strong ACID case, but note that the mechanisms discussed in this disclosure apply also to databases that do not provide full ACID properties.

Deadlock. A deadlock happens when two transactions A and B aim to update two rows of information but in the opposite order, such as if A updates row 1 then row 2 in the exact timeframe that B updates row 2 then row 1. In such a circumstance, A can't finish updating row 2 until B is finished, but B cannot finish updating row 1 until A is finished. No matter how much time is allowed to pass, this situation will never resolve itself. Because of this, a DBMS will typically kill the transaction that has done the least amount of work.

Isolation Levels. Of the four ACID properties, the isolation property is the one most often relaxed. When attempting to maintain the highest level of isolation, a DBMS usually acquires "locks" on data or implements multi-version concurrency control (MVCC, discussed below), which may result in a loss of concurrency. This requires adding logic for the application to function correctly.

Most DBMSs offer a number of transaction isolation levels, which control the degree of locking that occurs when selecting data. For many database applications, the majority of database transactions can be constructed to avoid requiring high isolation levels (e.g. SERIALIZABLE isolation level, see below), thus reducing the locking overhead for the system. The programmer must carefully analyze database access code to ensure that any relaxation of isolation does not cause software bugs that are difficult to find. Conversely, if higher isolation levels are used, the possibility of deadlock is increased, which also requires careful analysis and programming techniques to avoid. The isolation levels defined by the ANSI/ISO SQL standard are listed as follows:

a. SERIALIZABLE is the highest isolation level. With a lock-based concurrency control DBMS implementation, "serializability" requires read and write locks (acquired on selected data) to be released at the end of the transaction.

Also a special type of locks, "range" locks must be acquired when a SELECT query uses a ranged WHERE clause, especially to avoid "phantom reads." A phantom read occurs when in the course of a transaction, two identical queries executed one after the other return different results. This can happen because another simultaneous transaction has been allowed to modify the data in the meantime. To prevent this, a range lock can be acquired by the first transaction to prevent the second transaction from modifying data items in this range until the first transaction is finished and releases the lock.

A phantom read is a special case of a "non-repeatable read." A non-repeatable read occurs, when during the course of a transaction, a data item (e.g., a row) is retrieved twice and its value differs between reads. As in the case of phantom reads, this occurs because of a second ongoing transaction committing modifications to that item in the meantime.

A related phenomenon, the "dirty read" (also known as an "uncommitted dependency") occurs when a transaction is allowed to read data from an item that has been modified by another running transaction and not yet committed. Dirty reads work similarly to non-repeatable reads; however, the second transaction would not need to be committed for the first query to return a different result.

For non-lock based concurrency control, no locks are acquired; however, if the system detects a write "collision" (an attempt to write to the same data item database) among several concurrent transactions, only one of them is allowed to commit. The concept of snapshot isolation provides more details on this topic.

b. REPEATABLE READ. In this isolation level, a lock-based concurrency control DBMS implementation keeps read and write locks (acquired on selected data) until the end of the transaction. Range-locks, however, are not managed, so phantom reads can occur.

c. READ COMMITTED is an isolation level that guarantees that any data read is committed at the moment it is read. It restricts a reader from seeing any intermediate, uncommitted, dirty reads. This level, however, makes no promise whatsoever that if the transaction re-issues the read, it will find the same data; data is free to change after it is read.

In this isolation level, a lock-based concurrency control DBMS implementation keeps write locks (acquired on selected data) until the end of the transaction, but read locks are released as soon as the SELECT operation is performed—so the non-repeatable reads phenomenon can occur in this isolation level, as discussed below. As in the previous level, range-locks are not managed.

d. READ UNCOMMITTED is the lowest isolation level and it allows dirty reads, so one transaction may see not-yet-committed changes made by other transactions.

Since each isolation level is stronger than those below—in that no higher isolation level allows an action forbidden by a lower one—the standard permits a DBMS to run a transaction at an isolation level stronger than that requested (e.g., a READ COMMITTED transaction may actually be performed at a REPEATABLE READ isolation level).

Multiversion concurrency control (MCC or MVCC), is a concurrency control method commonly used by database management systems to provide concurrent access to the database and in programming languages to implement transactional memory.

Using locks for concurrency control can be very slow, so MVCC takes a different approach: each user connected to the database sees a snapshot of the database at a particular instant in time. Any changes made by a writer will not be seen by other users of the database until the changes have been completed (or, in database terms: until the transaction has been committed).

When an MVCC database needs to update an item of data, it will not overwrite the old data with new data, but instead mark the old data as obsolete and add the newer version elsewhere. Thus, there are multiple versions stored, but only one is the latest. This allows readers to access the data that was there when they began reading, even if it was modified or deleted part way through by someone else. It also allows the database to avoid the overhead of filling in holes in memory or disk structures but requires (generally) the system to periodically sweep through and delete the old, obsolete data objects. For a document-oriented database it also allows the system to optimize documents by writing entire documents onto contiguous sections of disk—when updated, the entire document can be re-written rather than bits and pieces cut out or maintained in a linked, non-contiguous database structure.

MVCC provides point in time consistent views. Read transactions under MVCC typically use a timestamp or transaction ID to determine what state of the DB to read, and read these versions of the data. Read and write transactions are thus isolated from each other without any need for locking. Writes create a newer version, while concurrent reads access the older version.

Outsourced Database Model. Platform as a Service (PaaS). Database as a Service (DBaaS)

Referring now to FIG. 1, in an outsourced database setting, the database server is physically off-premises and may reside in "the cloud" (i.e., in a data center managed by a cloud provider offering this service). A cloud database customer purchases the ability to place and query one or more datasets in the cloud-hosted server.

In a typical setup (called PaaS, "platform as a service", or DBaaS "database as a service"), database administration duties are split between the cloud provider and the cloud database customer. The cloud provider manages the physical and logical administration of the server software. The cloud database customer may act as a data owner and also manage the authorized database client credentials. Other arbitrary administrative setups are possible. In most of them, the cloud database customer naturally is the data owner and provides the data sets to be hosted by the cloud database.

Once a database is managed and hosted by a third party (the cloud database provider), a specific set of concerns appear mostly due to the fact that the data owner, data clients, and database server are not part of the same organization and trust realm. This brings about a shift in liability and data privacy and security concerns. The data is now hosted by a third party. Queries are executed by a remote server under the control of a third party.

Regulatory Challenges. Further, a large regulatory body governs data management, and privacy regulations hold a prominent place. Privacy regulations demand service providers to ensure that personal information is not accessed for any purpose other than the intended provision of services. Specifically, privacy regulations require service providers to employ data confidentiality, de-identify personal information before distribution, seek explicit permission from individuals before disclosing personal information, and to notify individuals in case of unauthorized access to individuals' personal information. Examples of privacy-centric regulations include:

a. The Health Insurance Portability and Accountability Act HIPAA: Sec 1177(a)—Penalties for wrongful disclosure of individually identifiable health information.
b. Patient Safety and Quality Improvement Act: Sec 922—Privilege and Confidentiality Protections. Sec 923—Computation of national and regional statistics preserving individual privacy.
c. Federal Information Security Management Act FISMA: Privacy Title III Sec 301 § 3547—Information security protections for national security systems.
d. Family Educational Rights and Privacy Act FERPA: Privacy 34 CFR § 99.31—Prevent unauthorized disclosure of education records.
e. Massachusetts Identity Theft Protection Regulation: Privacy Sec 16.04 to 16.06—Mandates reporting agencies to comply with authorized placement, lifting and removal of security freeze on consumer data.
f. The Children's Online Privacy Protection Act: Privacy Sec 1303(b)(D)—Require the service operator to establish and maintain reasonable procedures to protect the confidentiality, security, and integrity of personal information collected from children.
g. California Security Breach Information Act: Privacy Sec 4—Prompt notification of breach to any resident whose unencrypted personal information was, or is reasonably believed to have been, acquired by an unauthorized entity.
h. Data Protection Directive (EU): Privacy Section VIII Articles 16,17—Confidentiality and Security of Processing.
i. Personal Information Protection and Electronic Documents Act (Canada): Privacy Sec 4,5,6—Collection, retention and disposal of personal information; Schedule 1 Sec 5—Model code for the protection of personal information.
j. Regulation of Investigatory Powers Act (UK): Privacy Part III—Investigation of electronic data protected by encryption (power to require disclosure).
k. Data Protection Act (UK): Privacy Principle 3—Personal data shall be adequate, relevant and not excessive in relation to the purpose or purposes for which they are processed; Principle 5—personal data processed for any purpose or purposes shall not be kept for longer than is necessary for that purpose or those purposes.
l. Personal Data Protection Act (Singapore): Privacy Part IV—Collection, use and disclosure of personal data; Part V—Access to and correction of personal data; Part VI—Care of personal data protection, retention and transfer.
m. Information Technology Amendment Act (India): Privacy 66E—Prohibits publishing or transmission of image of private parts of an individual without consent.

In addition to privacy-centric regulation, numerous other regulatory acts (over 10,000 in the US alone) govern the management and processing of information, including data retention and audit regulation. All these acts combined impact and require at least some of the above security assurances. In view of these and other regulations, cloud customers aiming to deploy cloud database service may need to be provided assurances that allow compliant implementations and deployments.

Essential Security Properties. This is why, to consider cloud adoption, cloud database customers may demand a number of essential security properties specific to the outsourced database scenario ("secure outsourced data management assurances"). These may include:

a. Data Confidentiality. Ensure the outsourced data is encrypted and the server cannot read the plaintext values and only has access to the ciphertext.
b. Query Privacy. Ensure the semantics of the queries are not revealed to the server.
c. Query Authentication.
   i. Query Result Integrity. Each tuple in a result is derived from data in the actual database and the server cannot introduce new tuples in the result.
   ii. Query Result Correctness. A result was indeed correctly computed for a given query and data set. Each result tuple matches the query predicates.
   iii. Query Result Completeness. Clients can ascertain that results are computed over the entire dataset; all tuples that are supposed to be part of the query result are present, and no valid tuples are excluded.

Further, it goes without saying that the above security properties do not replace the need for the traditional security assurances associated with any data center, mandated by common sense as well as certain regulatory contexts, including network security, communication confidentiality, intrusion detection, malware removal, firewalling, denial of service attack defenses, authentication an so forth. Traditional security solutions can handle these assurances. For example, encryption can be used for providing communication confidentiality; specialized intrusion detection systems (IDSes) can be deployed as defense against illicit intrusions; antivirus scanners can be used to defeat and remove malware and so forth.

Moreover, it is noted that some of the secure outsourced data management assurances discussed here may in fact also resolve certain traditional security problems. For example, data confidentiality assurances may deploy encryption and in the process also provide an effective solution for traditional communication confidentiality. Overall however, this disclosure focuses mainly on the security assurances specific to the outsourced data management case.

Different Adversarial Models. Finally, depending on the level of trust that clients have in the cloud provider and its servers (generally, "cloud"), the client may require only some of the above security assurances. We consider the following different adversarial behaviors:

a. Physical Adversary. Direct physical compromise and attacks by cloud insiders or other parties that physically access server hardware to read information from memory, disks, CPUs, motherboards, network cards, cables, routers, or any other physical component comprised by the cloud are possible. In this case, privacy and data confidentiality assurances may be more difficult to provide without tamper-proof hardware.
b. Software-Only Adversary. The cloud does not physically access server hardware with illicit goals. In this case, query privacy assurances may be easier to provide even in the absence of tamper-proof hardware.
c. Honest-But-Curious Adversary (HBC). The cloud correctly participates in any interaction with clients, however—given the opportunity to get away undetected—the cloud may attempt to compromise the privacy of queries or the confidentiality of data and illicitly access information that the cloud is not entitled to.

d. Fully Malicious Adversary. The cloud is not trusted to correctly participate in interactions with clients, and—given the opportunity to get away undetected—the cloud may attempt to compromise any security aspect of its interaction with clients, including data confidentiality, query privacy, result integrity, correctness and completeness etc. This adversary may require enforcement of the full range of security assurances.

e. Denial of Service Adversary (DoS). A denial of service adversary may simply refuse to interact with the client or stop providing services. This adversary is usually not considered since DoS behavior is self-defeating for any rational cloud provider with commercial incentives to maintain their customer base.

It is contemplated that an adversary may feature several adversarial behaviors: a software-only adversary may be also fully malicious, or a physical adversary may be also honest-but-curious, and so forth.

Existing Work

Existing work addressing some of the above concerns comprises mainly academic research efforts which can be broadly categorized into several thrusts:

a. Privacy-Preserving Data Publishing. The sharing of personal information is permitted by certain regulations as long as appropriate measures are taken to render data not individually identifiable. To be practical, data usefulness must be preserved when data is de-identified. Research in the area of Privacy Preserving Data Publishing (PPDP) has strived to achieve de-identification while preserving data usefulness. The objective under PPDP is transformation of the original data to render inferences about individually identifiable information unlikely. Based on the privacy model, PPDP can be further classified into the subareas of k-anonymity, MultiR k-Anonymity, l-Diversity, Confidence Bounding, ($\alpha$, k)-Anonymity, (X, Y)-Privacy, (k, e)-Anonymity, Personalized Privacy, t-Closeness, $\delta$-Presence, (c, t)-Isolation, $\varsigma$-Differential Privacy, (d, $\gamma$)-Privacy, Distributional Privacy, Data Randomization, and Information Downgrading. While related, PPDP does not address any of the secure outsourced data management assurances discussed above.

b. Data Confidentiality. Encryption is commonly used to protect data residing with untrusted cloud services. The hope is that encryption will help data owners to stay compliant and benefit from the use of cloud services. Encryption limits the type of operations that can be performed on data, however, reducing the functionality that cloud services can offer. Both theoretical and systems research have thus focused on overcoming the limitations imposed by encryption on computation.

On the theoretical front, new mathematical constructs, such as "homomorphic encryption" have been devised to enable computation over encrypted data without the need for decryption. Implementations of these constructs, however, are not practical. For example, processing SQL queries using fully homomorphic encryption require days of processing to recover even a single database record—billions of times slower than traditional query processing. Even for primitive operations, such as addition of two integers, the cost associated with homomorphic encryption are orders of magnitude higher that processing of plaintext data.

It is important to note that the impracticality of homomorphic schemes arises not from implementation inefficiencies but is rooted in fundamental cryptographic hardness assumptions. The simplest of the homomorphic schemes permits the addition of two encrypted numbers without decrypting them and requires at least one modular multiplication operation which has been shown to costs upwards of six orders of magnitude more than the equivalent operation of adding two plaintext numbers.

In contrast, on the practical front systems research has effectively given up on resolving the general case of arbitrarily processing encrypted data. Instead, efforts have focused on providing confidentiality-preserving mechanisms for an extremely limited set of query types, such as simple range and basic aggregation queries. This narrow scope, however, severely limits the applicability of these ideas and as a result no commercially viable product has emerged in the past two decades.

c. Query Integrity. Similarly, for query integrity, the most practical results to date have also effectively given up on resolving the general case of providing integrity for arbitrary queries. Instead, efforts have focused on providing integrity-preserving mechanisms for an extremely limited set of query types, such as simple range queries. But again, this narrow scope severely limits the applicability of these ideas and as a result no commercially viable product has emerged.

Further Limitations of Existing Work. Moreover, in an attempt to provide solutions for more types of queries or to make the methods run faster, many of the existing results:

(a) require a-priori knowledge of any future queries or query types that will be submitted by clients;

(b) require sometimes-extensive pre-computation of metadata structures before queries can be submitted by clients;

(c) are designed for read-only queries and cannot efficiently handle data updates;

(d) can only encrypt certain portions of the data;

(e) deploy weaker security mechanisms such as "order preserving encryption" (which has been repeatedly shown to leak significant information about the plaintext, including the entire data in the worst case);

(f) operate under a weak security model in which the server is allowed to learn important things about the queries and outsourced data sets (such as which tuples in one relation have the same primary keys as the tuples in another relation, and other information about the data); and (g) do not allow multiple simultaneous clients to execute queries in parallel.

All of these weakened methods have been shown to be insecure and ultimately unusable from a security-sensitive client's point of view.

Overall, no solution exists for the efficient execution of arbitrary types of queries and data updates with full data confidentiality, query privacy and query authentication in an outsourced database model. Thus, there remains a need for a secure data management system and method which provides secure outsourced data management assurances while remaining practically viable for commercial deployment.

SUMMARY OF THE INVENTION

A secure data management system and method which separates query processing operations from transaction management and data storage operations to provides secure outsourced data management assurances while remaining practically viable for commercial deployment. The secure data management system and method comprises a untrusted database module which performs transaction management and data storage operations on encrypted data from at least one network accessible computer and a trusted database module which processes user generated queries and commands on a secure client device by selectively accessing, decrypting and re-encrypting the encrypted data on the at least one network accessible computer. In this regard, total privacy can be maintained while still outsourcing transaction management and data storage operations to untrusted third parties because all sensitive operations are performed in a secure environment and the transaction management and data storage operations can only access encrypted data.

BRIEF DESCRIPTION OF THE DRAWINGS

FIG. 9 illustrates a sample relational database with three relations linked through an "activity code" key.

DETAILED DESCRIPTION OF THE INVENTION

Figure 1:
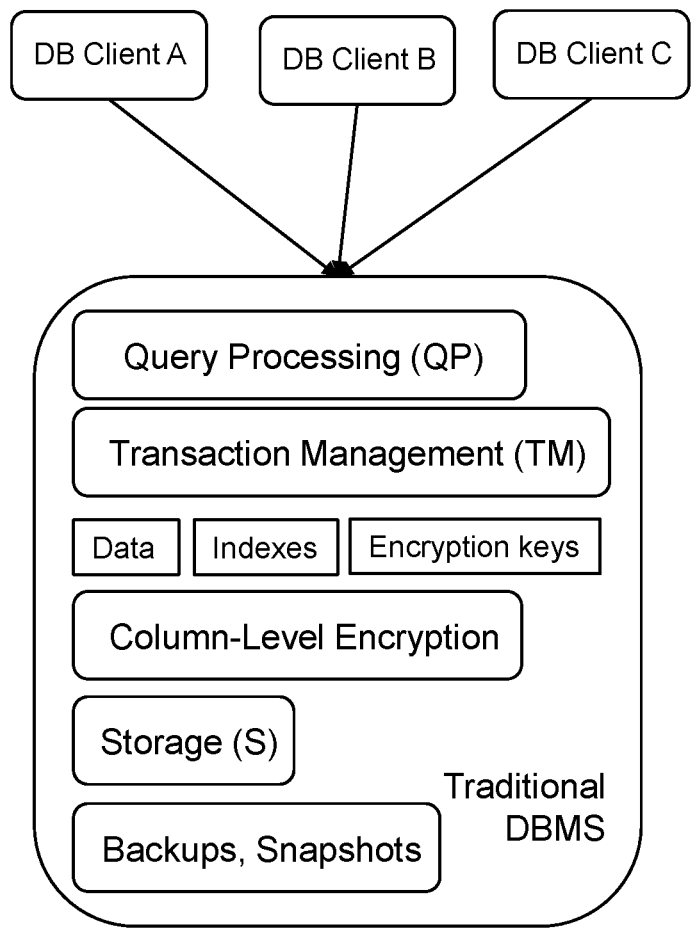
FIG. 1 is a block diagram showing the operational design of a database management system built in accordance with the prior art.

A system and method that provides the "secure outsourced data management" assurances as discussed above, including:
a. Data Confidentiality. Outsourced data is encrypted and the server cannot read the plaintext values and only has access to the ciphertext.
b. Query Privacy. The server cannot learn the semantics of the queries.
c. Query Authentication.
  i. Query Result Integrity. Each tuple in a result is derived from data in the actual database and the server cannot introduce new tuples in the result.
  ii. Query Result Correctness. A result was indeed correctly computed for a given query and data set. Each result tuple matches the query predicates.
  iii. Query Result Completeness. Clients can ascertain that results are computed over the entire dataset; all tuples that are supposed to be part of the query result are present, and no valid tuples are excluded.

Query Agnosticism. Further, the secure data management system also resolves other main limitations of prior art, such as the inability to provide a system that can handle any type of query. A viable system may need to allow not only read queries but updates as well and provide an efficient implementation thereof. The system may need not require a-priori knowledge about allowable queries that will be submitted by clients. The system may need not require expensive pre-computation of metadata to support queries (as such, the system is "query-agnostic").

Strong Security. The system also provides strongly encryption mechanisms to secure outsourced data management assurances of data confidentiality, query privacy and query authentication for the entire data set if requested by the customer. The use of weak encryption mechanisms such as order preserving encryption should not be necessary for the system to function. The security of the system should not be weakened or outright compromised by weak security constructs.

Parallel Query Processing and Transactions. Any viable system may need to allow the correct execution of queries submitted by multiple clients in parallel. Transactions submitted by multiple clients may need to be handled correctly and efficiently. ACID and strong transactional semantics are main elements of the value proposition of a modern database and any secure DBMS may need to at least offer the ability to run with different transactional semantics.

Challenges

To provide the above security properties and functionalities, sensitive assurances-enforcing code may need to be executed securely cloud-side in a "secure environment" (SE). Naturally, depending on the adversarial model, "securely" may mean different things—the level of protection the SE needs to offer, and the associated technology required to enforce it, may be different.

For example, in the case of a physical adversary, clients may require that SEs provide physical compromise protection, e.g., against data center insiders with physical access to the cloud hardware. Such protection may be offered by tamper-proof trusted hardware certified to detect and defend against physical adversaries. In this case, the SEs may use as a building block tamper-proof secure coprocessors.

On the other hand, in the case of a software adversary, clients may require that SEs provide protection against software-only compromise (e.g., software viruses or worms that may compromise the cloud operating system). In this case, different enforcement mechanisms may be appropriate, such as the use of Trusted Computing Group's Trusted Platform Modules (TPMs) which are not required to provide tamper-proof assurances but have other security functionality that can be used to defend against software compromise.

The SE protection mechanisms need not be hardware only and may be offered by leveraging hardware, software, or a combination thereof.

The system disclosed herein operates with different adversarial models and associated SEs of different protection levels, including future SEs and associated protection enforcement technologies. Overall, the system is not limited by assumptions of a given SE.

Protected Code. In the remainder of this disclosure, "protected code" will denote code that is being run inside a SE; "unprotected code" will denote any other code.

Cost of Security. Each enforcement technology handling certain adversarial model(s) comes at a premium. As a result, processing inside SEs may be significantly more expensive than processing in traditional unprotected computing environments, e.g., on a traditional unsecured server's CPU. For example, to defend against a physical adversary, the SEs may need to be designed to require the presence and use of expensive tamper-proof secure coprocessors in the cloud. In this case, protected code may be effectively an order of magnitude more expensive to run than unprotected code.

To maximize efficiency and speed while offering a desired level of security, there is thus a need for designs and mechanisms that minimize the amount of protected code required.

This is why, a contribution of the disclosed system is to minimize the amount of sensitive work needed to be implemented as protected code, while maximizing overall security, efficiency and functionality. The idea is to minimize the required private data processing while maximizing overall throughput and security strengths.

Design Insights

A number of insights underlie the systems disclosed here, including:
 a. The system can be designed to separate transaction management (TM) from query processing (QP). QP and TM can be performed separately.
 b. The system can be designed to break up the enforcement of ACID properties between different components based on the following insights:
   i. Enforcing Atomicity (A) may not require access to decrypted data.
   ii. Enforcing Consistency (C) may require access to decrypted data.
   iii. Enforcing Isolation (I) may not require access to decrypted data.
   iv. Enforcing Durability (D) may not require access to decrypted data.
 c. The system can be designed so that only QP requires access to the decrypted data.
 d. The system can be designed to execute some parts of QP on encrypted data.
 e. The system can be designed to perform TM on encrypted data only.
 f. The system can be designed so that the storage component (S) does not require access to decrypted data. In that case, data may be stored encrypted.
 g. The system can be designed to execute QP, TM and S, on different machines and allow them to communicate over a network.
 h. The system can be designed to optimize and secure the communication between QP and TM, e.g., by compressing and encrypting the traffic.

Figure 2:
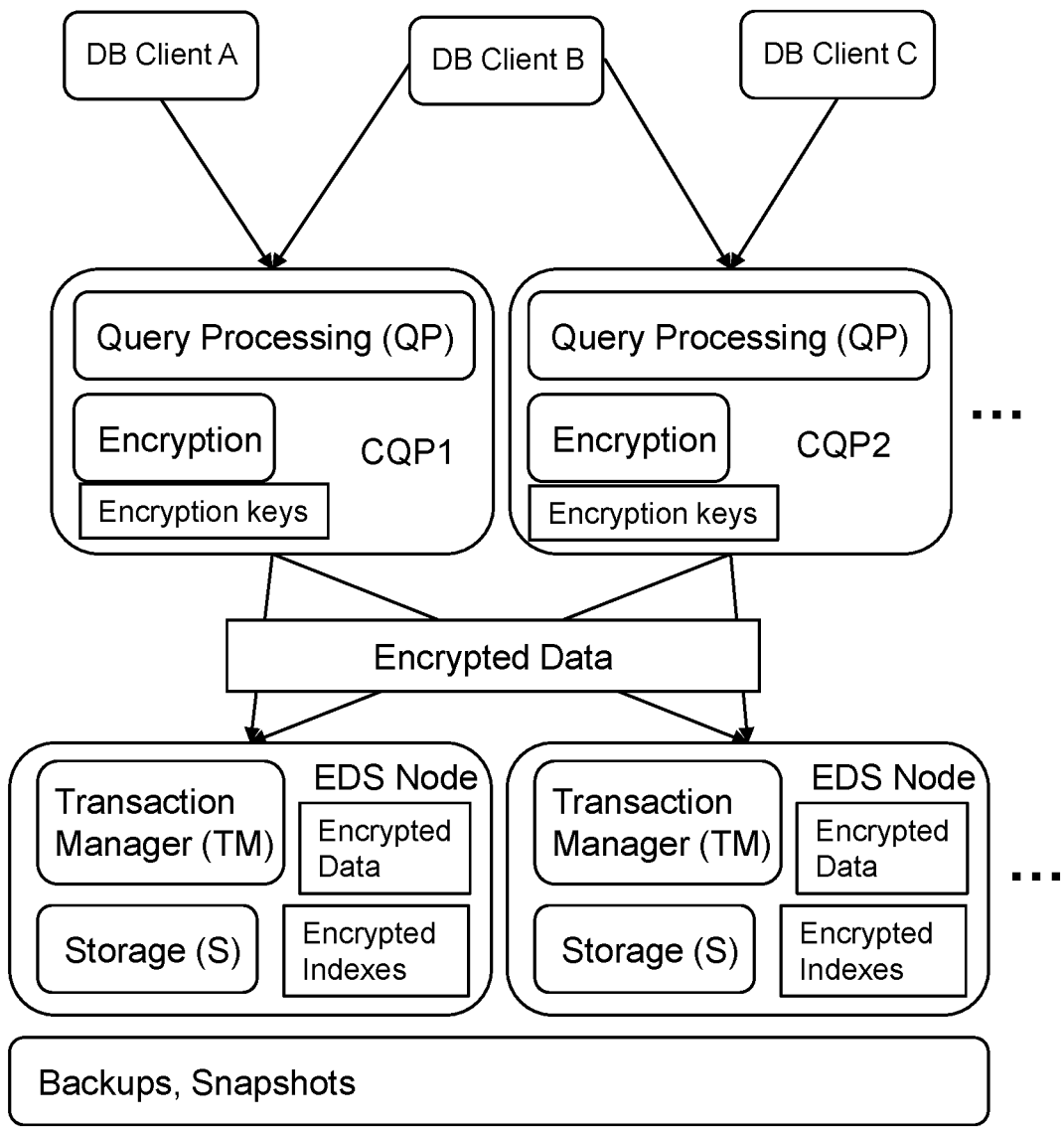
FIG. 2 is a block diagram of a showing the operational design of a secure data management system built in accordance with a first embodiment of the present invention.
Figure 3:
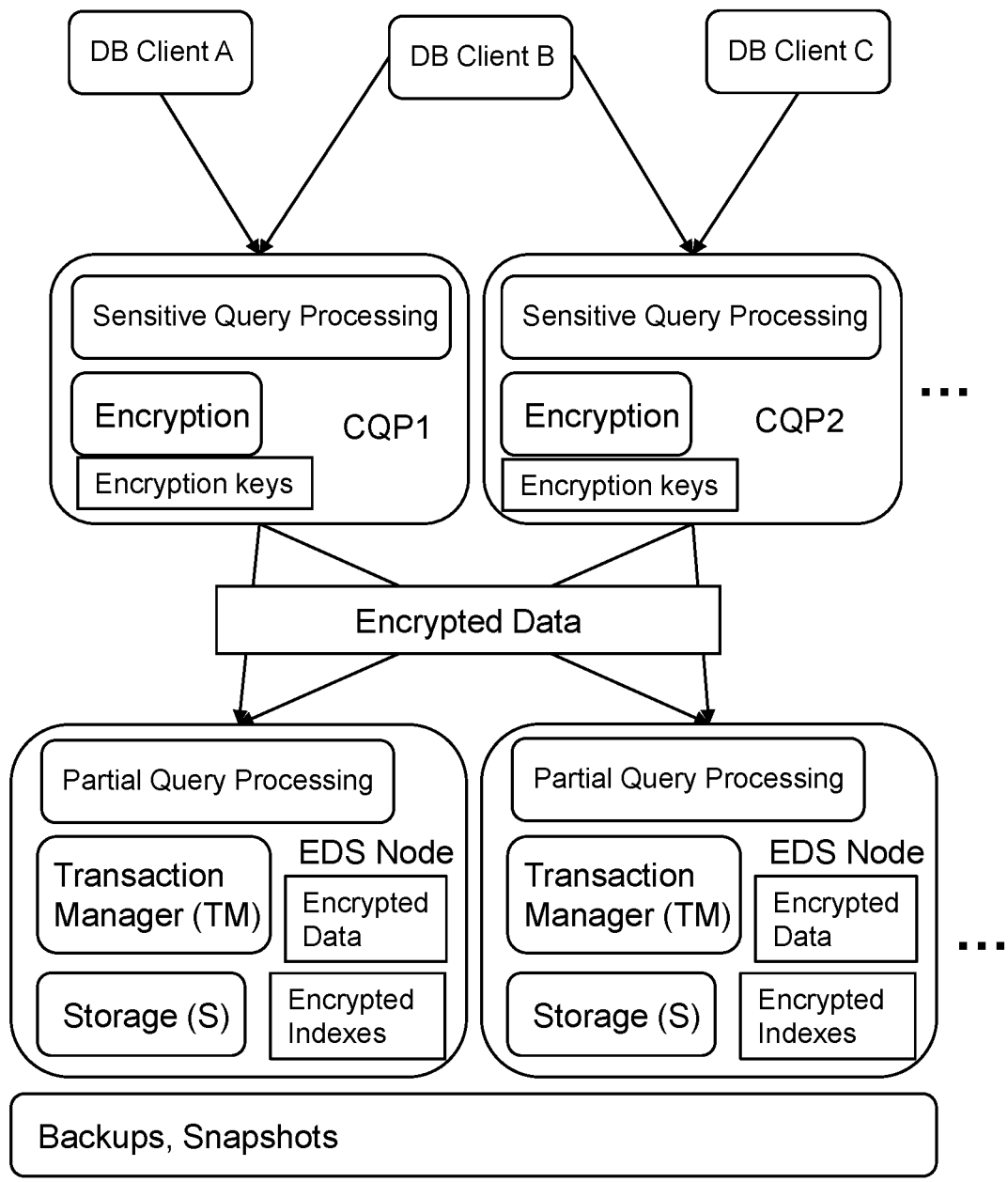
FIG. 3 is a block diagram of a showing the operational design of a secure data management system built in accordance with a second embodiment of the present invention

Referring now to FIGS. 2 and 3, the above insights lead to a system in which query processing (QP)—which requires access to decrypted data—may be implemented in protected code, whereas other components such as storage (S) and parts of transaction management (TM) may be implemented in unprotected code with access to encrypted data only.

Needless to say, storage (S) and transaction management (TM) may be separate components.

The component performing sensitive operations we will call Trusted Database (also "TDB", "CQP", "Trusted DBMS") whereas the components that performs operations on encrypted data, are collectively called an untrusted database (also "UDB", "EDS", "external DBMS").

Further, because Atomicity and Durability do not require access to decrypted data, the system can be designed to enforce and implement them in unprotected code.

Moreover, the system may be designed to enforce Isolation through the interaction between protected and unprotected code. If an isolation level of REPEATABLE READ can be provided by unprotected code, then the system may be designed to provide both REPEATABLE READ and SERIALIZABLE isolation levels to its security-sensitive queries.

Finally, since enforcing Consistency may require access to decrypted data, the system may require to implement some of the consistency enforcement in protected code. Certain consistency checks may not require access to decrypted data, however, and the system may implement these checks in unprotected code.

The QP component's protected code may access the storage component S to retrieve data records as needed. QP may also request transaction processing be performed (e.g., by issuing "START TRANSACTION" and "END TRANSACTION" requests) by TM.

In the process of accessing the data necessary to execute queries, QP may need to encrypt outgoing data and decrypt incoming data to ensure S only stores encrypted data.

Similarly, QP may need to encrypt/decrypt any transaction-specific information sent to TM.

It is contemplated that S may be offered by a traditional storage service.

In one embodiment, S may be a key-value pair storage system such as Cassandra.

TM may also be offered by an external transaction manager.

Use Traditional DBMS for Storage and Transaction Management

In one embodiment, the system is designed to use one or more traditional DBMS (which provides both data storage and transaction management) to serve as both the external storage service S and the external transaction manager TM.

To this end, in one embodiment, the system maps and organizes a data set of one or more trusted DBMSes within one or more untrusted databases while preserving a number of security and functionality properties.

To clients, CQPs provide the same functionality as a traditional DBMS. A CQP receives SQL queries (or commands) from clients. To process a client query, CQP accesses encrypted pages stored with EDSs. If client requests data modification, CQPs modify and encrypt the relevant pages before storing the pages with EDSs.

In one embodiment, CQPs encrypt all pages. The encrypted pages are stored in an EDS. The EDS does not have access to decryption keys and cannot read page contents. EDSs store and serve pages as requested by CQPs. During query processing, pages are decrypted by CQPs. To clients, the design gives ACID properties at tuple-level. To efficiently achieve tuple-level ACID properties for clients, the system deploys novel CQP-EDS interaction protocols and query processing techniques. An EDS provides Atomicity (A), Isolation (I), and Durability (D) on encrypted pages. The EDS thus gives A, I, and D from ACID. Many DBMSs available today, such as PostgreSQL and MySQL, provide ACID properties and are suitable to be used as EDSs. Since consistency (C) operations cannot be performed efficiently on encrypted data, the system executes consistency operations on decrypted data inside CQPs. CQPs perform significant portions of the query processing and provide the "C" in "ACID." An example of a consistency operation is checking whether an employee salary lies within a given salary range. CQPs may be stateless. CQPs can be started or stopped at any time without compromising data confidentiality or ACID properties. For scaling, multiple CQPs can connect to one or more EDSs. One rationale behind the design is to be able to run the stateless CQP instances in resource-constrained trusted environments while also providing scale out capability. The trusted environment for CQPs' deployment may be the enterprise or client machines or cloud-side secure hardware security module compute instances, containers or virtual machines, secured using client-acceptable hardware or software mechanisms.

Figure 4:
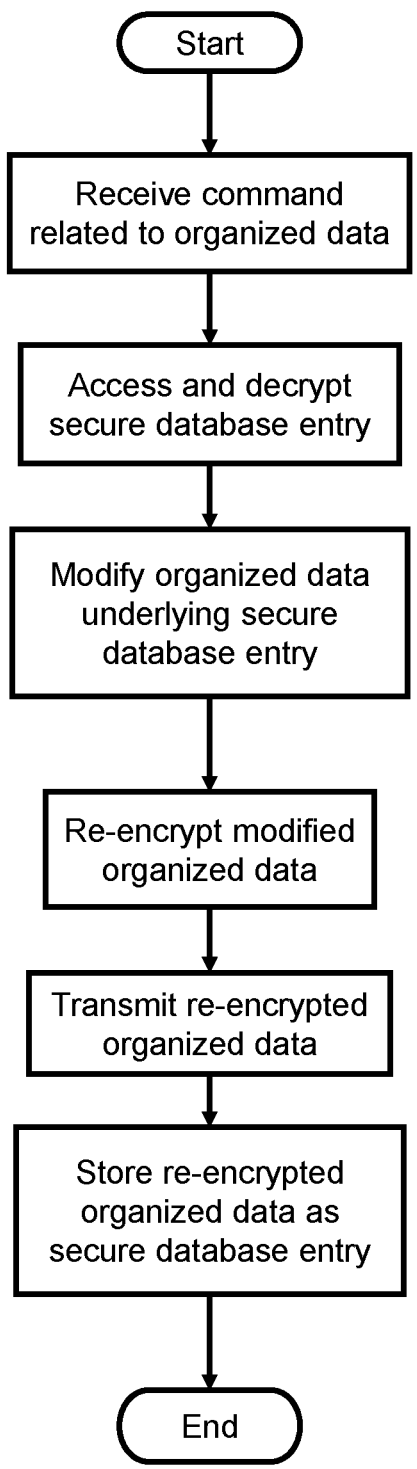
FIG. 4 shows the steps through which a secure data management system built in accordance with the present invention modifies organized data stored encrypted on an untrusted database management system.
Figure 5:
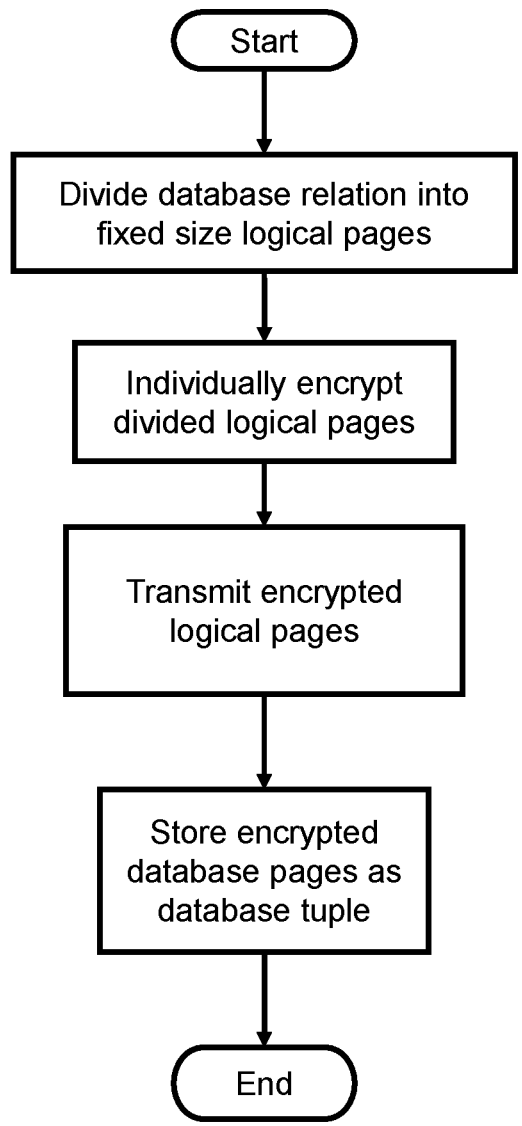
FIG. 5 shows the steps through which a secure data management system built in accordance with the present invention stores organized data on an untrusted database management system.

Referring now to FIGS. 4 and 5, in one embodiment, the system implements a TDB-EDS data mapping based on the following constraints:

a. Each relation may be divided into fixed-size "logical" pages by the CQP.
b. CQP pages may be stored as tuples within the EDS.
c. There may be a one-to-one mapping from CQP pages to tuples in the EDS.
d. The CQP may not store any data locally.
e. CQP pages may be encrypted before storage within the EDS.
f. CQP pages may be compressed before storage within the EDS.
g. The system may allow multiple CQPs to connect to the same EDS.

In another embodiment, for each file F of a relation R (including auxiliary relations), a CQP creates a relation E in an EDS. A CQP stores each page P of F as a unique, encrypted tuple in E. To read a page P of F, a CQP reads the corresponding tuple from E. To write a page P of F, a CQP modifies the corresponding tuple from E.

Connection Management.

Clients connect to CQPs. A client may issue multiple SQL queries during a single connection. For each client connection, a CQP maintains two connections to an EDS. The first connection, which we refer to as transactional connection (TC) is used by a CQP for client SQL queries that require all ACID properties. Typical operations performed using a TC include retrieving and storing encrypted pages, starting and committing transactions, getting transaction ids, and so forth. The second connection, which we refer to as non-transactional connection (NTC) is used for processing client SQL queries that do not require Atomicity (A) from ACID, such as queries on sequence relations.

Transactions.

CQPs provide full ACID transaction semantics to clients, partly by using the A, I, and D properties of EDSs.

In one embodiment, a CQP receives SQL queries (or commands) from clients. To process a client query, a CQP accesses encrypted pages stored with EDSs. If the client query requires data modifications, the CQP modifies and re-encrypts the relevant pages before storing the pages with EDSs.

In one embodiment, CQPs perform page retrievals and modifications using the Transactional Connection (TC). A CQP maps each client transaction to a transaction on EDS. All page retrieval and modifications are performed within an EDS's transaction.

In one embodiment, to map a client transaction to a unique transaction on an EDS, a CQP executes a transaction command on an EDS for every transaction command that the CQP receives from clients. The table below gives mapping for all transaction processing commands that are covered by CQPs to guarantee A, I, D properties to clients

| Client-to-CQP Transaction Command | Corresponding CQP-to-EDS Transaction Command |
|---|---|
| BEGIN | BEGIN |
| COMMIT | COMMIT |
| ROLLBACK | ROLLBACK |
| CREATE SAVEPOINT X | CREATE SAVEPOINT ENC(X)[1] |
| RELEASE SAVEPOINT X | RELEASE SAVEPOINT ENC(X) |
| ROLLBACK TO SAVEPOINT X | ROLLBACK TO SAVEPOINT ENC(X) |

[1]ENC(X) is the encryption of X using a secret encryption key. The encryption key is known only to CQPs.

Atomicity (A): By mapping each client transaction to an EDS transaction, a CQP guarantees that (1) a client transaction commits only if the corresponding transaction on an EDS commits, (2) a client transaction aborts if the corresponding transaction on an EDS aborts. (1) and (2) together ensure atomicity.

Isolation (I): Mapping each client transaction to an EDS transaction ensures that a page modification within client transaction A is not visible to a simultaneously executing client transaction B, ensuring isolation.

Repeatable Read Isolation Level: A CQP always starts an EDS transaction at the "REPEATABLE READ" isolation level. Therefore, if page P read by a CQP during client transaction A is modified by a simultaneously executing client transaction B, transaction A is aborted—ensuring Repeatable Read level for client data.

Figure 6:
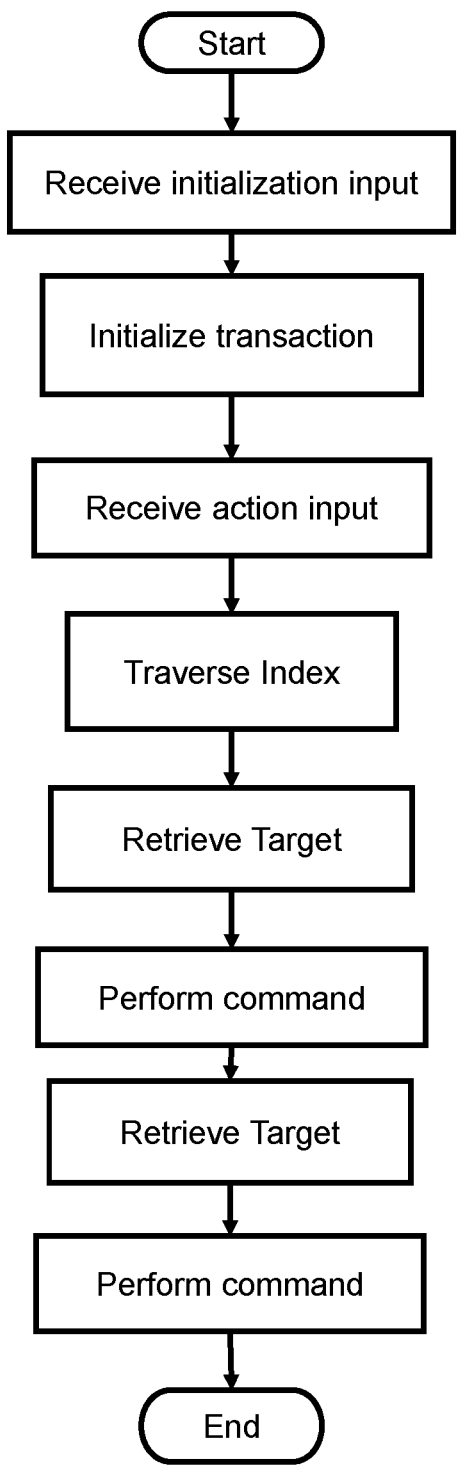
FIG. 6 shows the categorical steps through which a secure data management system built in accordance with the present invention maps client transaction by a CQP to an EDS.
Figures 7, 8:
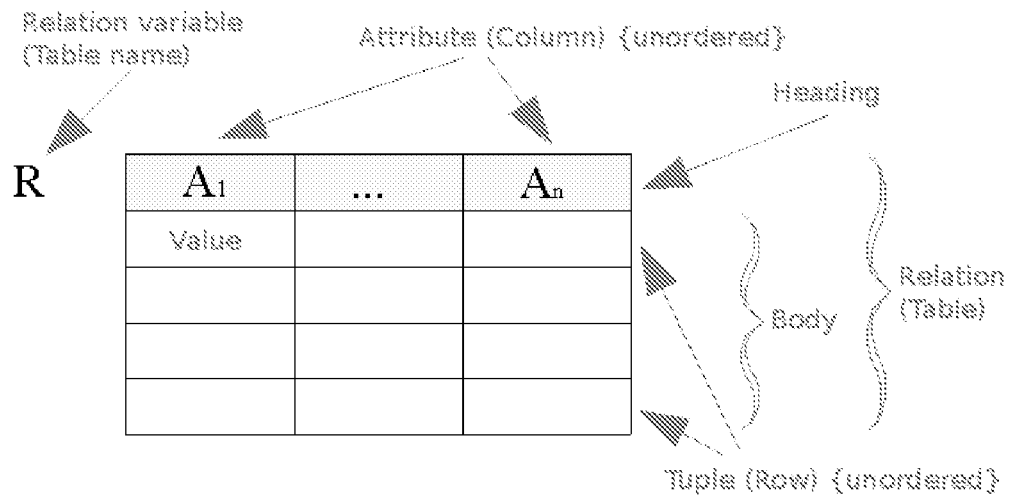
FIG. 7 illustrates a summary of the main elements of the relational model.
FIG. 8 illustrates a relation with customer information data.

Referring now to FIG. 6, an illustration of the categorical steps through which each client transaction is mapped by a CQP to an EDS on the secure data management system of the instant disclosure is shown. The interactions between a client, CQP, and EDS are further detailed as an exemplary SELECT query (i.e. command) run by a client in a transaction with Repeatable Read isolation level as follows:

*CONNECT INPUT
1.0. Client to CQP: Start Transaction with Repeatable Read Isolation Level
INITIALIZE TRANSACTION
2.0. CQP to EDS: Start Transaction with Repeatable Read Isolation Level;
3.0. CQP to EDS: Get transaction ID;
4.0. EDS to CQP: The transaction ID is T;
5.0. CQP to Client: Transaction started;
(END INITIALIZE TRANSACTION)
*ACTION INPUT AND TRAVERSE INDEX
6.0. Client to CQP: Query: Select Name from TaxPayers WHERE SSN='123-45-6789';
7.0. CQP to EDS: Give me root page (page 0) of index TaxPayers_idx;
8.0. EDS to CQP: compressed+encrypted root page of TaxPayers_idx;
9.0. CQP: decrypt and uncompress page;
10.0. CQP: search SSN='123-45-6789' in root page;
11.0. CQP: Determine on the next encrypted page to get from EDS; (for purposes of this example, page 12 determined);
12.0. CQP to EDS: Give me page 12 of index TaxPayers_idx;
13.0. EDS to CQP: compressed+encrypted page 12 of TaxPayers_idx;
14.0. CQP: decrypt and uncompress page;
15.0. CQP: search SSN='123-45-6789' in page 12;
16.0. CQP: Determine on the next encrypted page to get from EDS (Repeat steps 11-15 until SSN='123-45-6789' is found by CQP OR CQP determines that SSN='123-45-6789' does not exist);

(for purposes of this example, SSN found by CQP in page 67 of TaxPayers_idx);
(END TRAVERSE INDEX)
RETRIEVE TARGET
17.0. CQP: From page 67 of TaxPayers_idx, determine page of TaxPayers_data that will contain Name (for purposes of this example, page 34 of TaxPayers_data determined);
18.0. CQP to EDS: Give me page 34 of index TaxPayers_idx;
19.0. EDS to CQP: compressed+encrypted page 34 of TaxPayers_idx;
20.0. CQP: decrypt and uncompress page 34;
(END RETRIEVE TARGET)
PERFORM COMMAND
21.0. CQP: extract Name from page 34 where SSN='123-45-6789';
22.0. CQP to Client: Here is the Name of SSN='123-45-6789';
(END PERFORM COMMAND)
*FINALIZE INPUT
23.0. Client to CQP: Commit the transaction; COMMIT TRANSACTION
24.0. CQP to EDS: Commit the transaction;
**Case (SUCCESS ON EDS):
25.0. EDS to CQP: Transaction committed;
26.0. CQP to Client: Transaction committed.
**Case (FAILURE ON EDS):
25.0. EDS to CQP: Transaction failed;
26.0. CQP to Client: Transaction failed.

Similarly, when a client runs an UPDATE query in a transaction with Repeatable Read isolation level on the secure data management system of the instant disclosure, the interaction between the client, CQP, and EDS will proceed in much of the same manner, except with respect to the action input and the perform command (steps 6 and 21, and 22) as follows, showing the replaced and new steps:
  6.0. (Replacement) Client to CQP: Query: Update TaxPayers set Name="ChangedName" WHERE SSN='123-45-6789';
  21.0. (Replacement) CQP: update Name in page 34 where SSN='123-45-6789';
  21.1. (New) CQP: compress and encrypt page 34;
  21.2. (New) CQP to EDS: Save page 34 of TaxPayers_data with Transaction id T (T is the id from step 4);
  21.3. (New) EDS to CQP: page saved;
  22.0. (Replacement) CQP to Client: Update complete;

Serializable Isolation Level: to guarantee a SERIALIZABLE isolation level for client transactions, the system may be configured as follows:
  a. The Untrusted DBMS may provide REPEATABLE READ isolation levels for the pages of the CQP. The system may then translate the REPEATABLE READ level provided by the EDS into SERIALIZABLE isolation levels over the tuples from the original decrypted user data.
  b. To guarantee serializability, the CQP may performs the following operations:
    i. When a left boundary tuple is accessed from a B-tree index page, the left sibling page may also be read from the Untrusted DBMS.
    ii. When a right boundary tuple is accessed from a B-tree index page, the right sibling page may also be read from the Untrusted DBMS. Reading the sibling page may ensure that no other transaction can insert a tuple into the sibling page, since the EDS runs at REPEATABLE READ isolation level.

For example, when a client runs a SELECT query in a transaction with Serializable isolation level on the secure data management system of the instant disclosure, the interaction between the client, CQP, and EDS will differ from the example shown in paragraph 114, supra, as follows (the replaced and new steps shown):
  1.0. (Replacement) Client to CQP: Start Transaction with Serializable Isolation Level;
  2.0. (Replacement) CQP to EDS: Start Transaction with Repeatable Read Isolation Level;
  14.1. (New) CQP: Determine left and right siblings of page 12, say page 43 and 22;
  14.2. (New) CQP to EDS: Give me transaction ids of pages 43 and 22 of index TaxPayers_idx (Note CQP does not need to read entire pages, it just needs to tell EDS that it is reading something about pages 43 and 22);

Durability (D): In one embodiment, when a CQP receives a COMMIT command from a client, the CQP issues a COMMIT command to an EDS. After the commit on EDS succeeds, the CQP notifies client of the successful commit. By inherent property of EDS, a commit of an EDS's transaction ensures that the modified data is made durable.

In one embodiment, starting EDS transactions at the "REPEATABLE READ" isolation level as discussed above, ensures that pages modifications performed within a client transaction A are not overwritten by a simultaneously executing client transaction B. Thus, changes made by transaction A are durable on commit of A.

Consistency (C): In one embodiment, all consistency checks are performed by CQPs. For consistency, CQPs decrypt pages retrieved from an EDS. Checks for consistencies are performed on decrypted data.

In one embodiment, the CQP may be the PostgreSQL or the MySQL databases or a combination thereof.

As discussed above, databases such as PostgreSQL and MySQL organizes relations as files. Each relation is a collection of files. A file consists of fixed-size pages. Additionally a relation's files are organized in directories. In one embodiment, the system:
  a. Maps each CQP DBMS directory to a relational schema in the EDS.
  b. Each file within a directory is mapped to a relation in the schema corresponding to the file's parent directory in the EDS.
  c. Each of the file's pages is mapped to a tuple in the file's corresponding relation in the EDS.

In one embodiment, the EDS may be the PostgreSQL or the MySQL databases or a combination thereof.

It is appreciated that the database may be accessed by multiple clients. To this end, each of the clients may connect to one or more CQP which in turn may connect to the EDS that actually holds the data. Accordingly, multiple clients and CQPs can interact at the same time with an EDS.

It is contemplated that the CQP may be run in an environment which the client trusts so that a client may trust the CQP with their queries and access to the data. As such, in one embodiment, the CQP may be run on the client's computer which the client trusts. Further, in one embodiment, the CQP may be run inside a SE that is connected to the client and to the EDS. Thus, it is contemplated that in one embodiment; the SE may be located in the cloud.

DBMS-side Caching

Background: Accessing pages stored on durable mediums such as disks, can significantly add to transaction latency. To speedup transaction execution, DBMSs use (often in-memory) caching for pages. Relational DBMSs typically use a single cache per DBMS. All client connections access data from the same cache.

A cache stores a fixed number of pages. For correct cache operations DBMSs typically implement the following set of cache operations. Mark Page Dirty: When a page is modified this operation sets a flag on the page indicating that the page is dirty (has been modified). Marking the page as dirty is used as a hint to write the page to secondary (permanent) storage.

Invalidate Page: This operation invalidates a page in cache. Invalidation means that the cache entry is free and can be used to store another page fetched from secondary storage. Invalidation is performed after a page has been written to secondary storage or if the cache is full.

Invalidate Cache: This operation invalidates all cache entries.

Write Page: This operation writes the page that has been marked dirty to secondary storage.

In a typical DBMS, a single DBMS instance performs all of the above operations. Having a single DBMS perform all of the above operations simplifies ensuring transactions semantics (ACID) since the single DBMS instance has a complete view of the entire in-memory cache.

In one embodiment, the system proposed here may comprise multiple CQPs accessing one or more EDSes. Since the CQPs may not communicate or be aware of each other, each CQP may use a separate cache. To this end, in one embodiment, the system implements new cache operations that guarantee ACID properties even in the presence of multiple caches on separate CQPs as follows.

CipherQuery Mark Page Dirty: In one embodiment, when a page is modified, this operation sets a flag on the page indicating that the page is dirty (has been modified). Marking the page as dirty is used as a hint to write the page to EDS.

CipherQuery Invalidate Page: In one embodiment, this operation invalidates a page in cache. Invalidation means that the cache entry is free and can be used to store another page fetched from secondary storage. Invalidation is performed after a page has been written to EDS or if the cache is full.

CipherQuery Invalidate Cache: In one embodiment, this operation invalidates all cache entries.

CipherQuery Write Page: In one embodiment, this operation compresses, encrypts and then write a page that has been marked dirty to EDS.

To guarantee ACID properties with multiple CQPs, the timing of cache operations is critical. The following table summarizes when a CQP executes specific cache operations.

| Client-to-CQP Command | Cache Operation by a CQP within a client connection | | | |
| --- | --- | --- | --- | --- |
| | Write Dirty Buffer | Invalidate Buffer | Mark Buffer Invalid | Invalidate Cache |
| BEGIN | x | D1 | x | DI1 |
| SAVEPOINT | Yes | x | x | x |
| RELEASE SAVEPOINT | x | x | x | x |
| ROLLBACK TO SAVEPOINT | x | D2 | D2 | x |
| ROLLBACK | x | D3 | x | Yes |
| COMMIT | Yes | x | x | x |

DI1: If some other client connection executed a DDL statement, then Yes.

D1: If some other client connection executed a DDL statement, then Yes.

D2: If buffer is marked dirty, then Yes.

D3: Invalidate only if buffer is marked dirty.

Bulk-Write Optimizations

To minimize CQP-EDS latencies, in one embodiment, the system deploys a set of bulk-write optimizations that avoid multiple page writes from CQP to EDS. The optimizations improve overall throughput and eliminating unnecessary network traffic and associated round-trip latencies.

In one embodiment, when a cache entry is marked dirty, a CQP does not write the page to an EDS immediately. Instead, a CQP batches up all dirty buffers and writes them out to an EDS at transaction commit time. Delaying writes until commit time is acceptable because intra-transaction work is not saved on an EDS until commit time (EDS provides Atomicity). If a CQP dies in between, transaction on the EDS is aborted.

Read-Ahead Optimizations

The system is designed to minimize overall latency and the impact of network latency between between a CQP and an EDS—interactions between CQPs and EDSs involve page reads. Each page access may result in a latency hit that is beneficial to avoid.

DBMSs typically rely on the underlying storage mechanism (such as a File System) to perform read-aheads. A file system, however, has no knowledge of DMBS read behavior and cannot optimally predict the pages that would be accessed next by a DBMS. In one embodiment of the system introduced here, CQPs batch reads together in a single request to an EDS. This is referred to herein as "read-ahead" since to batch reads it must be known in advance what pages we will be using next. Several cases have been identified where it can be predicted with certainty what are the pages going to be requested from an EDS next. In these cases, a CQP batches reads together. It is important to not blindly read-ahead without checking the in-memory cache first, since some or even all of the pages that we are about to read ahead may already be present in the cache. Hence, before a CQP reads ahead, the CQP checks its in-memory cache and excludes all pages that are already present in the cache from the read batch. Following are the cases where a read-ahead is done.

Sequential Scan. A sequential scan involves reading all pages of a relation to find tuples that comprise a query result. In one embodiment, whenever a CQP does a sequential scan on a relation, the CQP reads pages in bulk from an EDS. The number of pages that a CQP reads ahead is a configuration parameter.

Index Scan. Often, DBMSes use auxiliary relations such as indexes to speed up query processing. An index is built on one or more relation attributes. If a DBMS determines that using an index would result in faster query execution, it first searches the index to determine the set of tuples that would form a query result. An index may not actually contain tuple data, but pointers to the main relation that contains the actual tuple data. In this case, a DBMS first finds an index entry that fits a query result, and then follows a pointer into the main relation to gather tuple data. This process is repeated separately for each index entry that satisfies query conditions.

In one embodiment of the system, when an index is used by a CQP, the CQP first gathers a batch of tuple pointers (pointers to tuples in the main relation) that comprise a query result. Then, in a single bulk-read operation a CQP fetches all the pages from an EDS that contain the tuples' data.

Bitmap Heap Scan. A traditional plain DBMS index scan fetches one tuple-pointer at a time from the index, and immediately visits that tuple in the table. A bitmap scan fetches all the tuple-pointers from the index in one go, sorts them using an in-memory "bitmap" data structure, and then visits the table tuples in physical tuple-location order. The bitmap scan improves locality of reference to the table at the cost of more bookkeeping overhead to manage the "bitmap" data structure—and at the cost that the data is no longer retrieved in index order, which doesn't matter for your query but would matter if you said ORDER BY.

A Bitmap heap scan normally involves two steps. In step one, an index is scanned to find the pages from the main relation that possibly contain tuples that are part of the query result. Instead of immediately following pointers to locate tuples in a main relation, a bitmap is created of all page identifiers that potentially contain result tuples. In step two, the page corresponding to each page identifier contained in the bitmap is visited to construct query results.

In one embodiment of the system, step two of bitmap heap scan is optimized to read pages in bulk (batch). Pages corresponding to a set of page identifiers from the bitmap are read in a single request from a CQP to an EDS. Note that existing DBMSes do not do batch reads (read-ahead) and instead rely on whatever read-ahead a file system may provide. But a file system cannot do read-ahead for heap scans since this requires knowing data semantics.

Non-Transactional Operations (Sequences)

DBMS sequences are special relations used as number generators. A sequence relation has a single tuple (contained within a single page) with a single numeric attribute. A sequence can be incrementing or decrementing. Sequence operations include the following: (i) Create Sequence—creates a new sequence relation; Setval—sets the value of the numeric attribute to a given value; nextval—gets the next value of the numeric attribute.

There are two complications with sequences that require special resolution in a distributed architecture. First, as per the SQL standard, sequence operations such as nextval do not follow transaction semantics (are not atomic). Even if a transaction that executes nextval( ) operation on a sequence aborts, the effect of nextval( ) persists. Second, the create sequence operation is atomic. If a transaction that creates a sequence aborts, the sequence is not created.

For example, consider the following sequence of SQL commands

| |
|---|
| BEGIN |
| create sequence seq3 |
| select nextval('seq3'); |
| ROLLBACK |

As a result of the transaction ROLLBACK sequence seq3 should not be created and nextval operation should also fail.

In one embodiment of the system, to ensure full compatibility with the SQL standard, the nextval operation is not atomic. To ensure non-atomicity of sequence operations, a CQP fetches and writes pages of sequence relations from an EDS using a non-transactional connection (NTC). This ensures that even if client transaction on CQP is aborted, sequence page writes will be persisted on EDS.

For example, when a client runs a sequence operation on the secure data management system of the instant disclosure, the interaction between the client, CQP, and EDS will differ from the example shown in paragraph 114, supra, as follows (the replaced and new steps shown):

1.0. (Replacement) Client to CQP: Start Transaction with Repeatable Read Isolation Level;
2.0. (Replacement) CQP to EDS: Start Transaction X1 on connection C1 with Repeatable Read Isolation Level;
3.0. (Replacement) CQP to EDS: Get transaction ID on C1;
4.0. (Replacement) EDS to CQP: The transaction ID is T1;
4.1. (New) CQP to EDS: Start Transaction X2 on connection C2 (Non transactional connection NTC);
4.2. (New) CQP to EDS: Get transaction ID on C2;
4.3. (New) EDS to CQP: The transaction ID is T2;
4.4. (New) CQP to EDS: Set default isolation mode on connection C2 as Read Committed;
(Note: In all steps 5-22 CQP uses connection C1)
22.1. (New) Client to CQP: Query: Select nextval('taypayerid_sequence').
*Client does a sequence operation;
22.2. (New) CQP switches to connection C2 (All subsequent operations step 22 with EDS will be done using C2);
22.3. (New) CQP to EDS: Give me page 0 of index taypayerid_sequence. A sequence has only one page;
22.4. (New) EDS to CQP: compressed+encrypted page 0 of taypayerid_sequence;
22.5. (New) CQP: decrypt and uncompress page 0;
22.6. (New) CQP: Increment sequence value in page 0;
22.7. (New) CQP: compress and encrypt page 0;
22.8. (New) CQP to EDS: Save page 0 of taypayerid_sequence with Transaction id T2 (T2 is the id from step 4.3);
22.9. (New) EDS to CQP: page saved;
22.10. (New) CQP: switches to connection C1 (All subsequent operations with EDS will be done using C1);
22.11. (New) CQP to client: update complete;

Further, to ensure atomicity of the create sequence operation, in one embodiment, a CQP records the transaction id of the transaction that creates the sequence. Then, on a nextval operation a CQP performs the following operation:

If nextval is called within the same client transaction that created the sequence, the sequence relations' page is written to EDS using the transactional connection (TC). Use of transactional connection ensures atomicity of sequence operations.

If nextval is called within a client transaction other than the transaction that created the sequence, the sequence relations' page is written to EDS using the non-transactional connection (NTC). Use of NTC in this case, ensures non-atomicity of sequence operations.

The result is conforming to original SQL standard behavior.

Cross-Component Caching

To reduce data transfer, in one embodiment of the system, a caching infrastructure such as Memcache or Redis, with one or more caching nodes may be deployed to achieve significant savings and effective inter-CQP coordination. Note that this cache is different from the per-client-connection, in-memory cache discussed earlier. One key insight behind the design is that the caching infrastructure will be used in a stateless manner so as to not require management and allow for easy handling of crashes, failures and restarts.

Specifically, whenever a CQP needs to read data from an EDS, the CQP first checks the cache which may be hosted in close proximity, either client- or enterprise-side or in the cloud. Only if the data is not in cache, is a read request made to EDS. When a data page is read from an EDS it is saved in the cache. A page write goes directly from the CQP to the EDS and the system also invalidates the cache entry.

Data in the cache system is encrypted. Hence, the cache can be located in untrusted environments.

Multiple CQPs can connect to one or more cache nodes. For a multi-node cache system, to preserve transaction semantics—especially isolation (I)—the system includes mitigation mechanisms for the issue of stale cached data which may arise because cache nodes may not communicate or synchronize with each other.

To this end, each page in an EDS contains the transaction identifier (ID) of the last transaction that modified the page. This ID is updated (by a CQP) on each page modification. Then, during transaction execution, a CQP records transaction IDs of the pages it read. At commit time, for each page read, the page's recorded transaction ID is compared with the transaction ID stored in EDS for that page. If the two transaction IDs match, a CQP is assured that no other CQP updated this page during the current CQP's client transaction. Hence, the commit proceeds. If the transaction IDs do not match, another CQP may have updated the page and committed its transaction. In this case, the current CQP aborts its client's transaction. This enables multiple, geographically distributed CQPs using the same, different, or overlapping cache nodes.

For example, when a client runs a SELECT query in a transaction with Repeatable Read isolation level on the secure data management system of the instant disclosure, with the CQP using an external caching component (CC) for increasing efficiency, the interaction between the client, CQP, CC, and EDS will proceed in a similar manner to that described in paragraph 114, supra. Advantageously, even with no communication between CC and EDS, or between CQPs, multiple CQPs can coordinate actions to safeguard high transaction isolation levels such as repeatable read and serializable. As illustrated below, CQPs detect violation of isolation levels in the presence of CC and automatically abort transactions to safeguard ACID properties (showing the replaced and new steps):

6.1. (New) CQP to CC: Give me root page (page 0) of index TaxPayers_idx;
    **Case 1:
        6.2. (New) CC to CQP: Here is compressed+encrypted root page (page 0) of index TaxPayers_idx. The transaction id on page 0 is T1;
        6.3. (New) CQP decrypt and uncompress page 0 of TaxPayers_idx;
        6.4. (New) CQP records  read from CC (CQP continues with step 10);
        (Note: 6.2-6.4 are done for each page CQP needs. Also, CQP records  for each page that it gets from CC)
    **Case 2:
        6:2. (New) CC to CQP: I don't have page 0 of TaxPayers_idx;
        6.3. (New) CQP to EDS: Give me root page (page 0) of index TaxPayers_idx;
        6.4. (New) EDS to CQP: compressed+encrypted root page of TaxPayers_idx, transaction ID on page is T2;
        6.5. (New) CQP to CC: Store (cache) compressed+encrypted page 0 with transaction ID T2 (CQP continues with step 8);
    23.1. (New) CQP to EDS: For each  recorded, tell me if any page has a transaction ID different than what the CC gave to CQP;
    **Case 1:
        23.2. (New) EDS to CQP: No all pages have correct Transaction IDs (CQP goes to step 24);
    **Case 2:
        23.2. (New) EDS to CQP: Pages P1, P2, . . . PN have different Transaction IDs that what the CC gave to CQP;
        23.3. (New) CQP to CC: Remove (invalidate) pages P1, P2, . . . PN from your storage;
        23.4. (New) CQP to EDS: Abort transaction (CQP goes to step 26 with following reason to client "Stale data read from CC, retry transaction.");

Transparent Retries

In one embodiment of the system, the granularity of the concurrency mechanisms provided by EDSes are arbitrary.

For example, in one instance, the system may use page-level concurrency. In this case, for page sizes (e.g., 4 KB) that contain multiple tuples, page-level concurrency may lead to a higher degree of update conflicts between clients than tuple-level concurrency would—especially at higher isolation levels (REPEATABLE READ and SERIALIZABLE).

To resolve this, the system deploys a mechanism for transparent retries. A CQP can transparently retry a transaction with an EDS—after an update conflict was detected and reported by the EDS—without propagating the information to the client before a certain number of retries fail.

Note however, that not all transactions can be retried, e.g., transactions with select queries followed by updates cannot be retried, since client may have computed updated values based on the result of previous selects. CQPs may automatically determine whether the current transaction can be retried and may then perform the retry if possible.

Asynchronous Reads

In traditional "Asynchronous Reads," to speed up future operations, clients can instruct a DBMS to read pages of certain relations (in background) from storage to in-memory cache.

In one embodiment of the system, "Asynchronous Reads" are intelligently triggered and do not require specific requests from clients. For example, when using cross-component caching, CQPs transparently read catalog data and store it into the cache. The amount of data read is a function of current activity and cache capacity. CQP keeps cache utilization at a high reducing cache misses for other CQPs.

In one embodiment, this mechanism can be implemented using PostgreSQL's prewarm feature.

MVCC-Based Concurrency Control

In the case of MVCC-based concurrency control, a mechanism may be needed to coordinate transaction semantics between multiple (QP) components.

As discussed above, read transactions under MVCC may typically use a timestamp or transaction ID to determine what state of the DB to read, and read these versions of the data. Read and write transactions may thus be isolated from each other without any need for locking. Writes may create a newer version, while concurrent reads may access the older version.

Thus, in the case of MVCC, each transaction executed by a CQP may require a unique transaction ID. To guarantee the uniqueness of assigned transaction IDs, the system may be designed to delegate new ID generation to the EDS: for each transaction, the CQP may query the EDS for a new, unique transaction ID.

Schema Changes

Detecting Schema Changes. To ensure correct end-to-end execution, any schema changes performed by a client (e.g., via a DDL statement execution) may need to be visible to other clients. For this, each time a CQP commits a transaction that performs a schema change (by changing catalog data or otherwise), the corresponding transaction ID may be recorded in the Untrusted DBMS. The CQP may also store the transaction ID locally. Then, at transaction start, the CQP may read the transaction ID of the last transaction that performed a schema change from the EDS. If it is not same as the locally stored transaction ID, then, a schema change has occurred. On detection of a schema change, a CQP may invalidate all schema-related data in its local cache.

Transaction Integrity

The system may need to also ensure integrity of data and correctness of query execution, including completeness of queries to the EDS which hosts the (S) and (TM) components.

More specifically, to ensure transaction integrity, the system may guarantee that compromise and tampering of any data stored within an EDS is detected by a CQP.

To this end, the system may be designed to use Merkle Hash Tree (MHT) based verification techniques. Further, portions of the MHT data may also be signed by a CQP.

Figure 10:
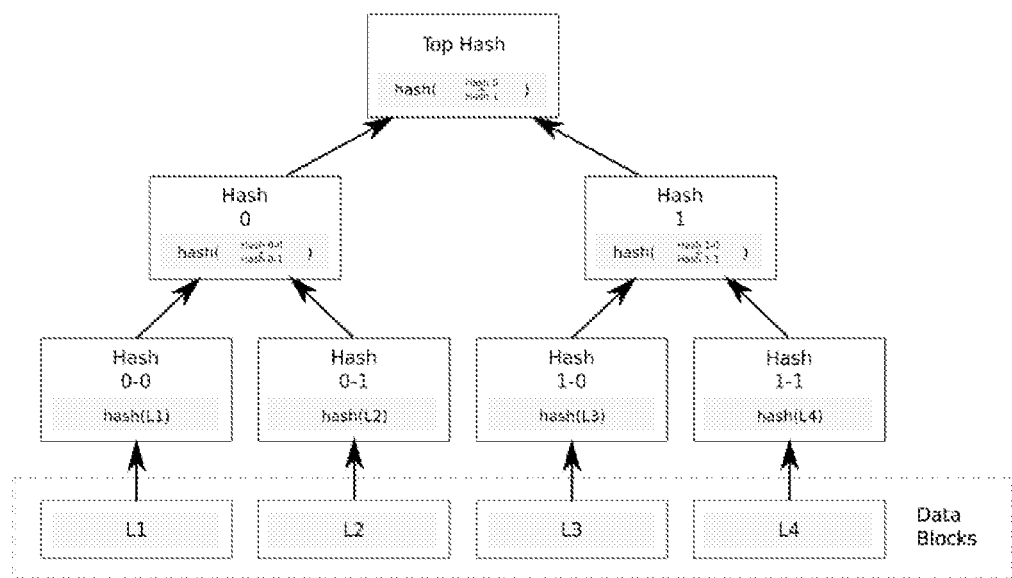
FIG. 10 illustrates a Merkel hash tree.

A Merkle hash tree (MHT), as illustrated in FIG. 10, is a tree data structure in which every non-leaf node is labeled with a hash checksum of the labels of its children nodes. MHTs are useful because they allow efficient and secure verification of the contents of large data structures. MHTs can be used to verify any kind of data stored, handled and transferred in and between computers.

Distribute Integrity Checksums. To further improve the performance of integrity verification, a set of trusted SEs may be dedicated to store checksums of individual pages, or portions of relevant MHT data. Then, each time a CQP reads a page from an EDS, the CQP may verify the read page by fetching the page's checksum from a corresponding trusted SE. When updating pages, a CQP may also update the corresponding checksums with the SEs.

Note that, for integrity verification of transaction ids, a CQP may include the transaction id of the transaction that last modified the page in the page checksum.

In one embodiment, the transaction id of the last modifying transaction may be part of the page itself. This then ensures also that the id may already be included implicitly in the page checksum.

Data Confidentiality

To provide data confidentiality, a system may be designed to ensure:

a. confidentiality of data at rest,
b. confidentiality of data in-transit,
c. that data is being accessed decrypted only by protected code.

To ensure confidentiality of data at rest while stored outside a SE, all outgoing data that protected code writes may be encrypted. Any incoming data may be decrypted.

Confidentiality of data in-transit may also be achieved using encryption. All communication between entities running protected code may be encrypted.

Encryption credentials may be comprised by one or more SE(s).

Query Privacy

Query Privacy. For query privacy, the system may need to prevent unprotected code from accessing the queries. To this end, the system may encrypt the communication between clients and the protected code QP components.

Query Data Access Pattern Privacy. Further, the system may deploy oblivious access mechanisms to prevent untrusted parties such as the cloud provider from understanding query semantics from underlying access patterns to data, e.g., such as may be evident in network traffic between a CQP and an EDS.

Examples of oblivious access mechanisms include Oblivious RAM (ORAM) mechanisms. ORAM is a useful primitive that allows a client to hide its data access patterns from an untrusted server in storage outsourcing applications. ORAM enables a client storing only a small amount of data locally to store a large amount of data in e.g., the cloud and access them while hiding the identities of the items being accessed. Informally, the adversary in ORAM (most often the server) should not be able to distinguish between equal-length sequences of queries made by the client to the server.

Scalability

To handle larger higher transaction rates, a system may need to automatically and securely be able to scale and add resources (such as additional CQP nodes) on demand, e.g., as a function of incoming load.

To this end, the system may endow protected code (such as the QP component of a CQP) running inside trusted SEs with the ability to securely "spawn" or "initiate" additional SEs and then upload into them the code (possibly a "clone" of the SE code itself) and credentials necessary to provide additional protected code running on behalf of the client.

Since the different CQPs may not be able to directly communicate with each other, they may use an EDS as a communication conduit, while ensuring all communication is encrypted.

It is contemplated that in a secure data management system in accordance with the present disclosure, only a trusted query processor module CQP has decryption keys, can decrypt data and process queries. Untrusted storage module S and untrusted transaction manager module TM do not have access to decryption keys and only operate on encrypted data. One or more CQPs can work with one or more TM and S components. The sensitive client database data pages and index pages are stored encrypted and/or compressed in an external untrusted data store EDS, and referenced by page IDs. The EDS may comprise both TM and S components. The EDS may be a relational database (pages may be stored as database tuples), a key-value object storage (pages are stored as objects), a (transactional) file system (pages may be stored as files), and so forth.

It is additionally contemplated that in a secure data management system in accordance with the present disclosure, multiple CQPs can be added and removed without impacting the database. CQP are configured do not require maintaining any state between transactions or to communicate with each other.

It is further contemplated that in a secure data management system in accordance with the present disclosure, CQPs are further configured to coordinate and correctly process transactions by intelligently storing and querying data and information?bout transactions (e.g., their IDs) including at least one the following:

(i) EDS records the transaction ID of the last client transaction that changed catalog data (CDTID), and any CQP may compare its local CDTID to the one provided by EDS and detect whether another CQP has changed the catalog data (catalog data=metadata/database schema etc), in which case the CQP it may invalidate its local CDTID and/or retrieve the latest catalog data from the EDS, (ii) each page contains the transaction ID of its last modifying transaction, and CQPs record the transaction IDs of the pages it read during a transaction execution—the EDS is configured to:
   determine, at transaction commit time, whether each read page was up to date, by comparing its recorded ID to the ID found in the latest EDS-hosted page, abort the transaction if the comparison fails.

It is contemplated that in a secure data management system in accordance with the present disclosure, CQPs may further be configured to transparently retry certain transactions with the external EDS without notifying the client; The CQPs may determine automatically if said certain transactions can be retried.

It is additionally contemplated that in a secure data management system in accordance with the present disclosure, CQPs may be configured to efficiently access the EDS-stored pages through a non-transactional connection NTC for client query operations that do not require Atomicity (A), including queries on sequence relations. Further, CQPs may be configured to access the EDS-stored information through a transactional connection TC for client query operations that require transactional properties—examples of such queries include retrieving and storing encrypted pages, starting and committing transactions, retrieving transaction IDs, etc.

It is further contemplated that in a secure data management system in accordance With the present disclosure, for each client transaction or query operations that require transactional properties, a CQP may start one or more transactions on the EDS and effectively map each client transaction to said one or more EDS transactions—effectively, a CQP may be configured to execute at least one transaction command on an EDS for every transaction command that the CQP receives from clients. The EDS may be configured to then access the associated encrypted pages required by the client operations within the context of said EDS transactions.

It is contemplated that in a secure data management system in accordance with the present disclosure, depending on the client transaction specifics, the EDS and said EDS transactions may be configured to have one or more of the following properties:
(i) guarantee atomicity;
(ii) guarantee that a client transaction commits only if the corresponding transaction on an EDS commits;
(iii) guarantee that a client transaction aborts if the corresponding transaction on an EDS aborts;
(iv) guarantee isolation;
(v) guarantee durability;
(vi) guarantee durability—for example by ensuring the CQP issues a COMMIT command to an EDS, every time it receives a COMMIT command from a client;
(vii) guarantee Repeatable Read Isolation for client data—for example by ensuring the CQP always starting an EDS transaction at the "REPEATABLE READ" isolation level;
(viii). guarantee Serializable Isolation to clients,—for example by the CQP performing the following additional operations on auxiliary relations:
   a. When a left boundary tuple is accessed from a B-tree auxiliary relation page, the left sibling page is also read from the EDS;
   b. When a right boundary tuple is accessed from a B-tree index page, the right sibling page may also be read from the Untrusted DBMS.

It is contemplated that in a secure data management system in accordance with the present disclosure, CQPs may deploy checksums to validate the integrity of the EDS-provided data, including validating information about the last transaction that modified each data page. Said checksums may themselves be stored in the EDS and a CQP may authenticate them for example by using a Merkle Hash tree.

It is additionally contemplated that in a secure data management system in accordance with the present disclosure, Each CQP may be configured to maintain its own cache in a manner that guarantees ACID properties in the presence of multiple CQPs as well as to optimize throughput, including taking one or more of the following steps:
(i) batching together and delaying all dirty cache entry writes until the transaction commit time, to optimize throughput ("bulks-write optimization");
(ii) batching together multiple future reads into a single request to the EDS ("read-ahead optimization"), including reads resulting from a sequential scan of a relation;
(iii) gathering a batch of tuple pointers from an index, then performing a single request to the EDS to fetch all associated pages that contain the associated tuple data;
(iv) optionally using a set of networked untrusted caching nodes ("caching infrastructure") to cache encrypted pages.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of managing secured data using an unsecured database management system, comprising the steps of:
providing a database management system having at least one processor and non-transitory memory, wherein said database management system is adapted to store organized data as a plurality of individually encrypted data pages, individually encrypted index pages, and individually encrypted catalog pages and manage database transactions related to the stored organized data from the defined dataset;
initializing by an alpha client processing device configured to communicate electrical signals with said database management system a desired database transaction related to organized data from a defined dataset which has been stored on the database management system;
receiving by the alpha client processing device an action input for the desired database transaction, wherein said action input includes at least one database command and is related to at least one target page that corresponds to at least one of an individually encrypted data page in the stored organized data from the defined dataset and an individually encrypted catalog page in the stored organized data from the defined dataset;
locating by the alpha client processing device the at least one target page in the stored organized data from the defined dataset, wherein the step of locating includes causing the database management system to transmit at least one encrypted index page in the stored organized data from the defined dataset that is related to the at least one target page to the alpha client processing device;
retrieving by the alpha client processing device the at least one target page, wherein the step of retrieving includes causing the database management system to transmit the at least one target page, while the at least one target page is still encrypted, to the alpha client processing device and decrypting the transmitted the at least one target page by the alpha client processing device, and wherein the step of retrieving is performed without providing said database management system access to decryption keys necessary to decrypt any of the encrypted data pages;

performing by the alpha client processing device the at least one database command on the decrypted at least one target page;

wherein the alpha client performs all query processing related to the desired database transaction, with query processing being performed at least partly on non-encrypted data so as to provide data consistency for the stored organized data;

wherein the database management system performs all transaction management related to the desired database transaction, with the transaction management being performed on encrypted data so as to provide database atomicity, isolation and durability;

wherein the unsecured database management system is not provided access to plaintext data; and wherein said database atomicity, isolation and durability is achieved by the combination of (1) the database management system having a relational database providing atomicity, isolation and durability of data stored therein, (2) the alpha client processing device performing a one-to-one mapping from said individually encrypted data pages to individual relational database tuples in the database management system, and (3) the alpha client processing device causing the database management system to store such an individually encrypted data page as a corresponding relational tuple in a relation in the database management system.

2. The method of claim 1, additionally comprising the steps of:
receiving by the alpha client processing device a finalize input related to the at least one database command and the at least one target page;
in response to the finalization input, commanding by the alpha client processing device the database management system to commit the desired database transaction;
wherein if the desired database transaction is successfully committed by the database management system, the method additionally comprises the step of notifying by the database management system the alpha client processing device that the desired database transaction was committed, thereby causing the alpha client processing device to generate an output indicating that the desired database transaction was committed; and
wherein if the desired database transaction fails to be successfully committed by the database management system, the method additionally comprises the step of notifying by the database management system the alpha client processing device that the desired database transaction failed, thereby causing the alpha client processing device to generate an output indicating that the desired database transaction failed; thereby causing the alpha client processing device to transparently retry at least one of the steps of locating, retrieving, performing and commanding in order to commit the desired database transaction; and/or thereby causing the alpha client processing device to transparently retry at least the steps of locating, retrieving, performing and commanding in order to commit the desired database transaction.

3. The method of claim 1, wherein the step of locating is defined by traversing by the alpha client processing device at least one index on said database management system, wherein the step of traversing includes decrypting by the alpha client processing device the at least one index page transmitted by the database management system to the alpha client processing device.

4. The method of claim 3, wherein the step of traversing by the alpha client processing device additionally includes identifying an encrypted child index page from the at least one index relative to the decrypted least one index page, causing the database management system to transmit the child index page, and decrypting by the alpha client processing device the child index page transmitted by the database management system.

5. The method of claim 1, wherein the step of initializing additionally includes commanding by the alpha client processing device the database management system to start a repeatable read isolation level database transaction.

6. The method of claim 1, wherein the step of performing additionally includes:
modifying by the alpha client processing device the decrypted at least one target page;
encrypting by the alpha client processing device the modified at least one target page; and
transmitting by the alpha client processing device the encrypted modified at least one target page to the database management system.

7. The method of claim 1, additionally comprising the steps of:
receiving by the alpha client processing device a connect input defined by a request to start a serializable isolation level transaction; wherein the step of initializing additionally includes commanding by the alpha client processing device the database management system to start a repeatable read isolation level database transaction;
wherein the step of locating is defined by traversing by the alpha client processing device at least one index on said database management system, wherein the step of traversing includes decrypting the at least one index page transmitted by the database management system to the alpha client processing device;
determining by the alpha client processing device sibling nodes of the decrypted at least one index page; and
requesting by the alpha client processing device a sibling transaction identifier for the determined sibling nodes.

8. The method of claim 1, additionally comprising the steps of:
wherein if the at least one individually encrypted index page requested from the external cache component is present on the external cache component, the step of locating additionally includes decrypting by the alpha client processing device the at least encrypted one index page requested by the alpha client processing device;
wherein if the at least one individually encrypted index page requested from the external cache component is not present on the external cache component, the step of locating additionally includes causing the database management system to transmit at least one encrypted index page in the stored organized data from the defined dataset that is related to the at least one target page to the alpha client processing device, storing the at least one encrypted index page transmitted by the database management system on the external cache component and decrypting by the alpha client processing device the at least one index page transmitted by the database management system;

retrieving by the alpha client processing device the at least one target page, wherein the step of retrieving includes causing the database management system to transmit the at least one target page, while still encrypted, to the alpha client processing device and decrypting the transmitted the at least one target page; and performing by the alpha client processing device the at least one database command on the decrypted at least one target page.

9. A secure data management system, comprising:

a database management system integral with at least one management computer having a processor and non-transitory memory, wherein said database management system adapts the at least one management computer to store organized data as a plurality of individually encrypted data pages and individually encrypted index pages and manage database transactions related to the stored organized data from the defined dataset;

at least one client processing module integral with at least an alpha client processing device adapted to communicate electrical signals with said at least one management computer, wherein said at least one client processing module adapts the alpha client processing device to:

(1) upon receipt of a connect input, initialize a desired database transaction related to the organized data from the defined dataset stored on the at least one management computer as the individually encrypted data pages and the individually encrypted index pages;

(2) upon receipt of an action input that includes at least one database command and is related to at least one target page that corresponds to at least one of the individually encrypted data pages, locate the at least one target page through selective downloading and decrypting of at least of the one encrypted index pages from said database management system without providing said database management system access to decryption keys necessary to decrypt any of the encrypted index pages;

(3) retrieve and decrypt the at least one target page from said database management system without providing said database management system access to decryption keys necessary to decrypt any of the encrypted data pages, wherein the retrieval of the at least one target page includes causing the database management system to transmit the at least one target page, while the at least one target page is still encrypted, to the alpha client processing device and decrypting the transmitted the at least one target page by the alpha client processing device, and wherein the retrieval of the at least one target page is performed without providing said database management system access to decryption keys necessary to decrypt any of the encrypted data pages; and (4) perform the at least one database command on the decrypted at least one target page;

wherein the alpha client performs all query processing related to the desired database transaction, with query processing being performed at least partly on non-encrypted data so as to provide data consistency for the stored organized data;

wherein the database management system performs all transaction management related to the desired database transaction, with the transaction management being performed on encrypted data so as to provide database atomicity, isolation and durability;

wherein the unsecured database management system is not provided access to plaintext data; and wherein said database atomicity, isolation and durability is achieved by the combination of (1) the database management system having a relational database providing atomicity, isolation and durability of data stored therein, (2) the alpha client processing device performing a one-to-one mapping from said individually encrypted data pages to individual relational database tuples in the database management system, and (3) the alpha client processing device causing the database management system to store such an individually encrypted data page as a corresponding relational tuple in a relation in the database management system.

10. The secure data management system of claim 9, wherein said at least one client processing module adapts the alpha client processing device to modify the decrypted at least one target page, encrypt the modified at least one target page, and transmit the encrypted modified at least one target page to the database management system when performing the at least one database command, without enabling said database management system to access the modified at least one target page prior to encryption.

11. The secure data management system of claim 9, wherein said at least one client processing module additionally adapts the alpha client processing device to:

upon receipt of a connect input, initialize the first database transaction on a first connection with the at least one management computer, set the first transaction to repeatable read isolation level, initialize a second database transaction related to the organized data from the defined dataset stored on the at least one management computer as the individually encrypted data pages and the individually encrypted index pages on a second connection with the at least one management computer, and set the second transaction to read committed isolation level;

locate the at least one target page and retrieve and decrypt the at least one target page through the first connection; and wherein the at least one database command includes a sequence operation and the sequence operation is done using the second connection.

12. The secure data management system of claim 9, wherein said at least one client processing module additionally adapts the alpha client processing device to:

upon committing a schema change transaction that changes catalog data on the stored organized data from the defined dataset, recording a unique catalog change identifier value on the at least one management computer;

detect any change in catalog data on the stored organized data from the defined dataset prior to attempting any database transaction by reading the value of unique catalog change identifier on the at least one management computer.

13. The secure data management system of claim 10, wherein said at least one client processing module additionally adapts the alpha client processing device to:

upon receipt of a connect input, initialize the first database transaction on a first connection with the at least one management computer, set the first transaction to repeatable read isolation level, initialize a second database transaction related to the organized data from the defined dataset stored on the at least one management computer as the individually encrypted data pages and the individually encrypted index pages on a second connection with the at least one management computer, and set the second transaction to read committed isolation level;

locate the at least one target page and retrieve and decrypt the at least one target page through the first connection; and wherein the at least one database command includes a sequence operation and the sequence operation is done using the second connection.

14. The secure data management system of claim 13, wherein said at least one client processing module additionally adapts the alpha client processing device to:

upon committing a schema change transaction that changes catalog data on the stored organized data from the defined dataset, recording a unique catalog change identifier value on the at least one management computer;

detect any change in catalog data on the stored organized data from the defined dataset prior to attempting any database transaction by reading the value of unique catalog change identifier on the at least one management computer.

15. The method of claim 1, wherein the alpha client processing device is one of a plurality of client processing devices, with each of the plurality of client processing devices configured to access the database management system.

16. The method of claim 15, additionally comprising the steps of:

mapping a relational database directory of the alpha client processing device to a relational schema in the database management system;

mapping each of a set of files within the relational database directory to a relation in the schema corresponding to a parent directory for each of the set of files being mapped in the database management system; and mapping each of a set of pages for each of the set of files being mapped to a tuple in for each of the set of files being mapped corresponding relation in the database management system.

17. The method of claim 16, wherein the alpha client processing device has at least two connections to the database management system, including a first connection defining a transactional connection being used by the alpha client processing device to process SQL queries requiring data atomicity, and a second connection defining is a non-transactional connection being used by the alpha client processing device to process SQL queries that do not require data atomicity.

18. The method of claim 17, additionally comprising the steps of:

receiving by the alpha client processing device a finalize input related to the at least one database command and the at least one target page;

in response to the finalization input, commanding by the alpha client processing device the database management system to commit the desired database transaction;

wherein if the desired database transaction is successfully committed by the database management system, the method additionally comprises the step of notifying by the database management system the alpha client processing device that the desired database transaction was committed, thereby causing the alpha client processing device to generate an output indicating that the desired database transaction was committed; and wherein if the desired database transaction fails to be successfully committed by the database management system, the method additionally comprises the step of notifying by the database management system the alpha client processing device that the desired database transaction failed, thereby causing the alpha client processing device to generate an output indicating that the desired database transaction failed; thereby causing the alpha client processing device to transparently retry at least one of the steps of locating, retrieving, performing and commanding in order to commit the desired database transaction; and/or thereby causing the alpha client processing device to transparently retry at least the steps of locating, retrieving, performing and commanding in order to commit the desired database transaction.

19. The method of claim 18, wherein the step of locating is defined by traversing by the alpha client processing device at least one index on said database management system, wherein the step of traversing includes decrypting by the alpha client processing device the at least one index page transmitted by the database management system to the alpha client processing device.

20. The method of claim 19, wherein:

the step of traversing by the alpha client processing device additionally includes identifying an encrypted child index page from the at least one index relative to the decrypted least one index page, causing the database management system to transmit the child index page, and decrypting by the alpha client processing device the child index page transmitted by the database management system;

the step of initializing additionally includes commanding by the alpha client processing device the database management system to start a repeatable read isolation level database transaction; and the step of performing additionally includes: modifying by the alpha client processing device the decrypted at least one target page, encrypting by the alpha client processing device the modified at least one target page, and transmitting by the alpha client processing device the encrypted modified at least one target page to the database management system.

21. The method of claim 20, additionally comprising the steps of:

receiving by the alpha client processing device a connect input defined by a request to start a serializable isolation level transaction; wherein the step of initializing additionally includes commanding by the alpha client processing device the database management system to start a repeatable read isolation level database transaction;

wherein the step of locating is defined by traversing by the alpha client processing device at least one index on said database management system, wherein the step of traversing includes decrypting the at least one index page transmitted by the database management system to the alpha client processing device;

determining by the alpha client processing device sibling nodes of the decrypted at least one index page; and requesting by the alpha client processing device a sibling transaction identifier for the determined sibling nodes.

22. The method of claim 21, additionally comprising the step of:
- wherein if the at least one individually encrypted index page requested from the external cache component is present on the external cache component, the step of locating additionally includes decrypting by the alpha client processing device the at least encrypted one index page requested by the alpha client processing device;
- wherein if the at least one individually encrypted index page requested from the external cache component is not present on the external cache component, the step of locating additionally includes causing the database management system to transmit at least one encrypted index page in the stored organized data from the defined dataset that is related to the at least one target page to the alpha client processing device, storing the at least one encrypted index page transmitted by the database management system on the external cache component and decrypting by the alpha client processing device the at least one index page transmitted by the database management system;
- retrieving by the alpha client processing device the at least one target page, wherein the step of retrieving includes causing the database management system to transmit the at least one target page, while still encrypted, to the alpha client processing device and decrypting the transmitted the at least one target page; and performing by the alpha client processing device the at least one database command on the decrypted at least one target page.

23. The method of claim 1, additionally comprising the steps of:
- mapping a relational database directory of the alpha client processing device to a relational schema in the database management system;
- mapping each of a set of files within the relational database directory to a relation in the schema corresponding to a parent directory for each of the set of files being mapped in the database management system; and
- mapping each of a set of pages for each of the set of files being mapped to a tuple in for each of the set of files being mapped corresponding relation in the database management system.

24. The method of claim 1, wherein the alpha client processing device has at least two connections to the database management system, including a first connection defining a transactional connection being used by the alpha client processing device to process SQL queries requiring data atomicity, and a second connection defining is a non-transactional connection being used by the alpha client processing device to process SQL queries that do not require data atomicity.

* * * * *